(12) United States Patent
Nakamura et al.

(10) Patent No.: US 12,097,928 B2
(45) Date of Patent: Sep. 24, 2024

(54) CONTROL DEVICE FOR HUMAN-POWERED VEHICLE, CONTROL SYSTEM FOR HUMAN-POWERED VEHICLE, AND METHOD FOR SETTING CONTROL STATE OF CONTROL DEVICE

(71) Applicant: Shimano Inc., Osaka (JP)

(72) Inventors: Jumpei Nakamura, Osaka (JP); Kenta Kawakami, Osaka (JP); Toshio Tetsuka, Osaka (JP); Nobuyuki Kakinoki, Osaka (JP); Taihei Nishihara, Osaka (JP); Kazuhiro Fujii, Osaka (JP); Hiroaki Takeshita, Osaka (JP)

(73) Assignee: Shimano Inc., Osaka (JP)

( * ) Notice: Subject to any disclaimer, the term of this patent is extended or adjusted under 35 U.S.C. 154(b) by 403 days.

(21) Appl. No.: 17/459,401

(22) Filed: Aug. 27, 2021

(65) Prior Publication Data

US 2022/0063757 A1 Mar. 3, 2022

(30) Foreign Application Priority Data

Aug. 31, 2020 (JP) .................................. 2020-146436
Jun. 15, 2021 (JP) .................................. 2021-099767

(51) Int. Cl.
  *B62M 6/45* (2010.01)
  *B62J 45/20* (2020.01)
  *B62J 50/22* (2020.01)

(52) U.S. Cl.
  CPC ................ *B62M 6/45* (2013.01); *B62J 45/20* (2020.02); *B62J 50/22* (2020.02)

(58) Field of Classification Search
  CPC ............. B62M 6/45; B62J 45/20; B62J 50/22
  See application file for complete search history.

(56) References Cited

U.S. PATENT DOCUMENTS

| | | | |
|---|---|---|---|
| 2015/0120119 A1* | 4/2015 | Tauchi | B62M 15/00 701/22 |
| 2015/0307157 A1* | 10/2015 | Gao | B62M 6/45 701/52 |
| 2016/0347411 A1* | 12/2016 | Yamamoto | B62M 25/08 |
| 2017/0355412 A1* | 12/2017 | Takeshita | B62J 11/00 |
| 2019/0315433 A1* | 10/2019 | Hasumi | B62M 6/50 |
| 2019/0389535 A1* | 12/2019 | Moening | B62M 6/90 |
| 2020/0207216 A1* | 7/2020 | Hasumi | B62M 6/50 |

(Continued)

FOREIGN PATENT DOCUMENTS

| | | |
|---|---|---|
| CN | 109969331 A1 | 7/2019 |
| JP | 9-39875 A | 2/1997 |

(Continued)

*Primary Examiner* — Hunter B Lonsberry
*Assistant Examiner* — Harrison Heflin
(74) *Attorney, Agent, or Firm* — Global IP Counselors, LLP

(57) ABSTRACT

A human-powered vehicle control device includes an electronic controller that is configured to control an electric component of the human-powered vehicle in at least one control state selected from multiple control states that at least partially differ from each other. A number of the at least one control state is changeable. A human-powered vehicle control system includes the human-powered vehicle control device. Also, a method is carried out to set a control state of the human-powered vehicle control device.

21 Claims, 14 Drawing Sheets

(56) References Cited

U.S. PATENT DOCUMENTS

2021/0114687 A1\* 4/2021 Chang .................... B62K 23/02
2021/0284278 A1\* 9/2021 Wada ....................... B62J 45/20

FOREIGN PATENT DOCUMENTS

| JP | 9-95289 A | 4/1997 |
| JP | 10-250673 A | 9/1998 |
| JP | 2003-164104 A | 6/2003 |
| JP | 2004-284523 A | 10/2004 |
| JP | 5202769 B1 | 6/2013 |
| JP | 2016-22954 A | 2/2016 |

\* cited by examiner

CONTROL DEVICE FOR HUMAN-POWERED VEHICLE, CONTROL SYSTEM FOR HUMAN-POWERED VEHICLE, AND METHOD FOR SETTING CONTROL STATE OF CONTROL DEVICE

CROSS-REFERENCE TO RELATED APPLICATIONS

This application claims priority to Japanese Patent Application No. 2020-146436, filed on Aug. 31, 2020, and Japanese Patent Application No. 2021-099767, filed on Jun. 15, 2021. The entire disclosures of Japanese Patent Application No. 2020-146436 and Japanese Patent Application No. 2021-099767 are hereby incorporated herein by reference.

BACKGROUND

Technical Field

The present invention generally relates to a control device for a human-powered vehicle, a control system for a human-powered vehicle, and a method for setting a control state of a control device.

Background Information

Japanese Laid-Open Patent Publication No. 2016-22954 (Patent Document 1) discloses an example of a control device for a human-powered vehicle that changes a control state of a motor in accordance with the operation of an input portion.

SUMMARY

One object of the present disclosure is to provide a control device for a human-powered vehicle, a control system for a human-powered vehicle, and a method for setting a control state of a human-powered vehicle control device that improve the usability.

A control device in accordance with a first aspect of the present disclosure is for a human-powered vehicle. The control device basically comprises an electronic controller configured to control an electric component of the human-powered vehicle in at least one control state selected from multiple control states in which the multiple control states are at least partially different from each other. A number of the at least one control state is changeable. With the control device according to the first aspect, the number of the at least one control state is changeable, so that the number of the at least one control state can be set to the number of control states desired by a user. Thus, usability is improved.

In accordance with a second aspect of the present disclosure, the control device according to the first aspect further comprises a first storage configured to store first control information related to the at least one control state. The electronic controller is configured to control the electric component in accordance with the first control information. With the control device according to the second aspect, the electronic controller controls the electric component in accordance with the first control information stored in the first storage.

In accordance with a third aspect of the present disclosure, in the control device according to the second aspect, the first storage is configured to change the first control information stored in the first storage in accordance with operation of a first operating device. With the control device according to the third aspect, the user can change the number of the at least one control state by operating the first operating device to change the first control information stored in the first storage.

In accordance with a fourth aspect of the present disclosure, the control device according to the second or third aspect further comprises a second storage configured to store second control information related to the multiple control states. The first control information includes at least some of the second control information. With the control device according to the fourth aspect, the second control information related to the multiple control states is used to obtain the first control information.

In accordance with a fifth aspect of the present disclosure, in the control device according to the fourth aspect, the electronic controller is configured to change the first control information stored in the first storage using the second control information. With the control device according to the fifth aspect, the second control information is used to change the first control information.

In accordance with a sixth aspect of the present disclosure, the control device according to the second aspect further comprises a communication device configured to communicate with an external device and receive the first control information from the external device. The electronic controller is configured to change the first control information stored in the first storage with the first control information received by the communication device. With the control device according to the sixth aspect, the first control information stored in the first storage is changed with the first control information received by the communication device. This eliminates the need for the first storage to store information related to all of the pieces of control information in advance.

In accordance with a seventh aspect of the present disclosure, the control device according to any one of the second to sixth aspects further comprises a third storage configured to store third control information related to two or more of the multiple control states and fourth control information related to at least one or more of the multiple control states. At least one of the two or more of the multiple control states related to the third control information differs from at least one of the at least one or more of the multiple control states related to the fourth control information. The electronic controller is configured to control the electric component in accordance with one selected from the third control information and the fourth control information. The electronic controller is configured to control the electric component in the two or more of the multiple control states in a case where the third control information is selected. The electronic controller is configured to control the electric component in the at least one or more of the multiple control states in a case where the fourth control information is selected. With the control device according to the seventh aspect, the third control information or the fourth control information is selected to increase the number of control states, decrease the number of control states, and change the combination of control states.

In accordance with an eighth aspect of the present disclosure, the control device according to any one of the first to seventh aspects is configured so that the electric component includes a motor configured to apply a propulsion force to the human-powered vehicle. The at least one control state relates to control of the motor. With the control device according to the eighth aspect, the electronic controller controls the motor in accordance with the at least one control state.

In accordance with a ninth aspect of the present disclosure, the control device according to the eighth aspect is configured so that the at least one control state differs in an assist level of the motor. The at least one control state includes three or more control states including a maximum control state in which the assist level is maximum, a minimum control state in which the assist level is minimum, and one or more intermediate control states in which the assist level is lower than the maximum control state and higher than the minimum control state. The electronic controller is configured to change the assist level in the maximum control state and the assist level in the minimum control state in a case where the three or more control states are selected from the multiple control states. The electronic controller is configured to change the assist level in the intermediate control states in accordance with the assist level in the maximum control state and the assist level in the minimum control state. With the control device according to the ninth aspect, in a case where the at least one control state includes three or more control states and at least one of the assist level in the maximum control state and the assist level in the minimum control state is changed, the assist level in the intermediate control states is automatically changed. This further improves usability.

In accordance with a tenth aspect of the present disclosure, in the control device according to the ninth aspect, the electronic controller is configured to change the assist level in the maximum control state and the assist level in the minimum control state in accordance with operation of an operating device. The control device according to the tenth aspect allows the user to change the assist level in the maximum control state and the assist level in the minimum control state in accordance with operation of the operating device. This further improves usability.

In accordance with an eleventh aspect of the present disclosure, in the control device according to the ninth or tenth aspect, the electronic controller is configured to change the assist level in the intermediate control states in accordance with operation of an operating device. The control device according to the eleventh aspect allows the user to change the assist level in the intermediate control states in accordance with operation of the operating device. This further improves usability.

In accordance with a twelfth aspect of the present disclosure, the control device according to any one of the ninth to eleventh aspects is configured so that the assist level includes at least one of a maximum ratio of an assist force produced by the motor to a human driving force that is input to the human-powered vehicle, an upper limit value of an output of the motor, and a change ratio of the change rate of the output of the motor to the change rate of the human driving force. With the control device according to the twelfth aspect, a setting desirable for the user is obtained by changing at least one of the maximum ratio in each control state, the upper limit value of the output of the motor, and the change ratio.

In accordance with a thirteenth aspect of the present disclosure, the control device according to any one of the ninth to eleventh aspects is configured so that the assist level is an upper limit value of an output of the motor. The electronic controller is configured to control the motor so that as the human driving force input to the human-powered vehicle increases, the assist force produced by the motor increases until the output of the motor reaches the upper limit value. The electronic controller is configured to control the motor so that human driving force at a maximum ratio of the assist force produced by the motor to human driving force input to the human-powered vehicle decreases as the assist level increases. With the control device according to the thirteenth aspect, until the output of the motor reaches the upper limit value, as the assist level increases, the increase amount of the assist force produced by the motor increases relative to the increase amount of human driving force input to the human-powered vehicle. This allows the rider to readily accelerate the human-powered vehicle.

In accordance with a fourteenth aspect of the present disclosure, the control device according to any one of the ninth to eleventh aspects is configured so that the assist level is an upper limit value of an output produced by the motor. The electronic controller is configured to control the motor so that as human driving force input to the human-powered vehicle increases, the assist force produced by the motor increases until the output of the motor reaches the upper limit value. The electronic controller is configured to control the motor so that human driving force at a maximum ratio of the assist force produced by the motor to human driving force input to the human-powered vehicle is greater in at least one of the intermediate control states than in the maximum control state and the minimum control state. The control device according to the fourteenth aspect allows the rider to easily accelerate the human-powered vehicle even in the minimum control state.

A control device in accordance with a fifteenth aspect of the present disclosure is for a human-powered vehicle. The control device comprises an electronic controller configured to control an electric component including a motor that applies a propulsion force to the human-powered vehicle in multiple control states, and a first storage configured to store first control information related to two or more of the multiple control states and second control information related to at least one or more of the multiple control states. At least one of the two or more of the multiple control states related to the first control information differs from at least one of the at least one or more of the multiple control states related to the second control information. The electronic controller is configured to control the electric component in accordance with one selected from the first control information and the second control information. The electronic controller is configured to control the electric component in the two or more of the multiple control states in a case where the first control information is selected. The electronic controller is configured to control the electric component in the at least one or more of the multiple control states in a case where the second control information is selected. With the control device according to the fifteenth aspect, the first control information or the second control information is selected to increase the number of control states, decrease the number of control states, and change the combination of control states. Thus, usability is improved.

In accordance with a sixteenth aspect of the present disclosure, in the control device according to the seventh or fifteenth aspect, the electronic controller is configured to select the third control information or the fourth control information in accordance with operation of an operating device. With the control device according to the sixteenth aspect, the user operates the operating device to select the third control information or the fourth control information.

In accordance with a seventeenth aspect of the present disclosure, the control device according to any one of the seventh, fifteenth, and sixteenth aspects is configured so that at least one of the third control information and the fourth control information is changeable. With the control device according to the seventeenth aspect, at least one of the third control information and the fourth control information is changeable. This further improves the usability.

In accordance with an eighteenth aspect of the present disclosure, the control device according to the eighth or fifteenth aspect is configured so that the multiple control states differ in at least one of a ratio of an assist force produced by the motor to human driving force input to the human-powered vehicle, an upper limit value of an output of the motor, and a change ratio of a change rate of the output of the motor to a change rate of the human driving force. With the control device according to the eighteenth aspect, the electronic controller controls the motor in the multiple control states that differ in at least one of the ratio of assist force produced by the motor to human driving force input to the human-powered vehicle, the upper limit value of the output of the motor, and the change ratio of the change rate of the output of the motor to the change rate of human driving force.

In accordance with a nineteenth aspect of the present disclosure, the control device according to the eighteenth aspect is configured so that the ratio increases as the human driving force increases. With the control device according to the nineteenth aspect, the electronic controller controls the motor in accordance with a ratio that increases as human driving force increases.

A control system in accordance with a twentieth aspect of the present disclosure is for a human-powered vehicle. The control system comprises the control device according to the eighteenth or nineteenth aspect and a display device. The display device is configured to show display information corresponding to the multiple control states. With the control system according to the twentieth aspect, the display device shows display information corresponding to the multiple control states. This allows the user to readily recognize the multiple control states.

In accordance with a twenty-first aspect of the present disclosure, the control system according to the twentieth aspect is configured so that the display information includes a graph showing the ratio. With the control system according to the twenty-first aspect, the user readily recognizes the multiple control states with the graph.

A method in accordance with a twenty-second aspect of the present disclosure is for setting a control state of a control device for a human-powered vehicle. The control device includes an electronic controller configured to control an electric component of the human-powered vehicle in at least one control state selected from multiple control states in which the multiple control states are at least partially different from each other. The method comprises changing a number of the at least one control state that was selected from the multiple control states. With the method for setting the control state of the control device for a human-powered vehicle according to the twenty-second aspect, the number of the at least one control state is changeable so that the number of the at least one control state can be set to the number of control states desired by the user. Thus, usability is improved. Thus, usability is improved.

According to the present disclosure, the human-powered vehicle control device, the human-powered vehicle control system, and the method for setting a control state of a human-powered vehicle control device improve the usability.

BRIEF DESCRIPTION OF THE DRAWINGS

Referring now to the attached drawings which form a part of this original disclosure.

DETAILED DESCRIPTION OF EMBODIMENTS

Figure 1:
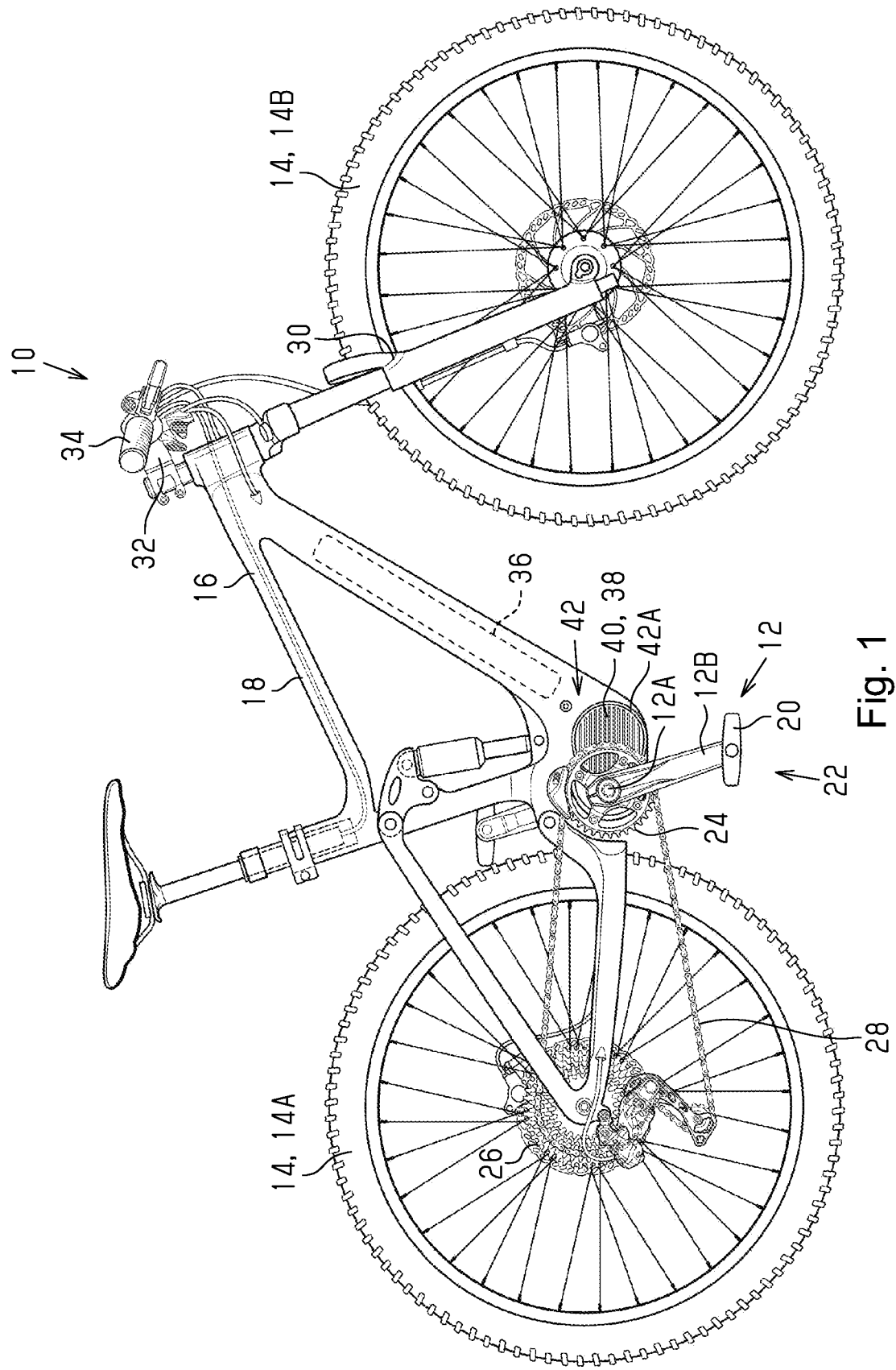
FIG. 1 is a side elevational view of a human-powered vehicle including a control device for the human-powered vehicle and a control system for the human-powered vehicle in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A first embodiment of a human-powered vehicle control device 60, a human-powered vehicle control system 50, and a method for setting a control state of the human-powered vehicle control device 60 will now be described with reference to FIGS. 1 to 9. A human-powered vehicle 10 is a vehicle including at least one wheel and driven by at least human driving force H. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a vehicle including three or more wheels. The human-powered vehicle 10 is not limited to a vehicle configured to be driven only by human driving force H. The human-powered vehicle 10 includes an E-bike that uses driving force of an electric motor in addition to the human driving force H for propulsion. The E-bike includes an electric assist bicycle that assists propulsion with an electric motor. In the embodiments described below, the human-powered vehicle 10 refers to an electric assist bicycle. An example of the electric assist bicycle is a mountain bike.

The human-powered vehicle 10 includes a crank 12 into which a human driving force H is input. The human-powered vehicle 10 further includes at least one wheel 14 and a vehicle body 16. The at least one wheel 14 includes a rear wheel 14A and a front wheel 14B. The vehicle body 16 includes a frame 18. The crank 12 includes an input rotational shaft 12A and two crank arms 12B. The input rotational shaft 12A is rotationally provided relative to the frame 18. The two crank arms 12B are respectively provided on opposite axial ends of the input rotational shaft 12A. In the present embodiment, the input rotational shaft 12A is a crank axle. Two pedals 20 are respectively coupled to the crank arms 12B. The rear wheel 14A is driven in accordance with rotation of the crank 12. The rear wheel 14A is supported by the frame 18. The crank 12 and the rear wheel 14A are coupled by a drive mechanism 22.

The drive mechanism 22 includes a first rotary body 24 coupled to the input rotational shaft 12A. The input rotational shaft 12A and the first rotary body 24 can be coupled so as to rotate integrally with each other or can be coupled via a first one-way clutch. The first one-way clutch is configured to rotate the first rotary body 24 forward in a case where the crank 12 rotates forward and allow the first rotary body 24 to rotate relative to the crank 12 in a case where the crank 12 rotates rearward. The first rotary body 24 includes a sprocket, a pulley, or a bevel gear. The drive mechanism 22 further includes a second rotary body 26 and a linking member 28. The linking member 28 transmits rotational force of the first rotary body 24 to the second rotary body 26. The linking member 28 includes, for example, a chain, a belt, or a shaft.

The second rotary body 26 is coupled to the rear wheel 14A. The second rotary body 26 includes a sprocket, a pulley, or a bevel gear. Preferably, a second one-way clutch is provided between the second rotary body 26 and the rear wheel 14A. The second one-way clutch is configured to rotate the rear wheel 14A forward in a case where the second rotary body 26 rotates forward and allow the rear wheel 14A to rotate relative to the second rotary body 26 in a case where the second rotary body 26 rotates rearward. The human-powered vehicle 10 can include a shifting device. The shifting device includes at least one of an external shifting device and an internal shifting device. The external shifting device includes, for example, a derailleur, the first rotary body 24, and the second rotary body 26. The derailleur includes at least one of a front derailleur and a rear derailleur. The first rotary body 24 can include multiple sprockets. The second rotary body 26 can include multiple sprockets. The internal shifting device can be provided, for example, on a hub of the rear wheel 14A or in a power transmission path between the input rotational shaft 12A and the first rotary body 24.

The front wheel 14B is attached to the frame 18 via a front fork 30. A handlebar 34 is coupled to the front fork 30 via a stem 32. In the present embodiment, the rear wheel 14A is coupled to the crank 12 by the drive mechanism 22. However, any one of the rear wheel 14A and the front wheel 14B can be coupled to the crank 12 by the drive mechanism 22.

The human-powered vehicle 10 further includes a battery 36. The battery 36 includes one or more battery elements. The battery elements include a rechargeable battery. The battery 36 is configured to supply electric power to the control device 60. Preferably, the battery 36 is connected to an electronic controller 62 of the control device 60 by an electric cable or a wireless communication device to communicate with the electronic controller 62. The battery 36 is connected by, for example, Power Line Communication (PLC), Controller Area Network (CAN), or Universal Asynchronous Receiver-Transmitter (UART) to the electronic controller 62 in a manner allowing for communication.

The human-powered vehicle 10 includes an electric component 38. Preferably, the electric component 38 includes a motor 40 that is configured to apply a propulsion force to the human-powered vehicle 10. The motor 40 includes one or more electric motors. The electric motor is, for example, a brushless motor. The motor 40 is configured to transmit rotational force to at least one of the front wheel 14B and the power transmission path of the human driving force H extending from the pedals 20 to the rear wheel 14A. The power transmission path of human driving force H extending from the pedals 20 to the rear wheel 14A includes the rear wheel 14A. In the present embodiment, the motor 40 is provided on the frame 18 of the human-powered vehicle 10, and is configured to transmit rotational force to the first rotary body 24.

The motor 40 is provided on a housing 42A. The housing 42A is provided on the frame 18. The housing 42A is, for example, detachably attached to the frame 18. A drive unit 42 is configured to include the motor 40 and the housing 42A on which the motor 40 is provided. In the present embodiment, preferably, a third one-way clutch is provided on the power transmission path between the motor 40 and the input rotational shaft 12A so that in a case where the input rotational shaft 12A is rotated in a direction in which the human-powered vehicle 10 travels forward, rotational force of the crank 12 will not be transmitted to the motor 40. In a case where the motor 40 is provided on at least one of the rear wheel 14A and the front wheel 14B, the motor 40 can be provided on a hub and form a hub motor together with the hub.

The control system 50 includes the control device 60 and a display device 52. Preferably, the display device 52 is provided on an external device 80. The external device 80 includes at least one of a cycle computer, a smartphone, a tablet computer, and a personal computer. The display device 52 includes a liquid crystal display panel and an organic electroluminescent (EL) panel.

Preferably, the control system 50 further includes a first operating device 54. Preferably, the first operating device 54 is provided on the external device 80. The first operating device 54 includes at least one of a touchscreen, a mouse, a keyboard, and a button.

The external device 80 includes an electronic controller 82. The electronic controller 82 includes a processor that executes a predetermined control program. The processor of the electronic controller 82 includes, for example, a central processing device (CPU) or a micro processing device (MPU). Thus, the controller 82 includes at least one processor 82A. The electronic controller 82 can include processors provided at positions separate from each other. The electronic controller 82 can include one or more microcomputers. Preferably, the external device 80 further includes storage 84. The storage 84 stores various control programs and information used for various control processes. The storage 84 is any computer storage device or any non-transitory computer-readable medium with the sole exception of a transitory, propagating signal. For example, the storage 84 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The control device 60 includes the electronic controller 62. The electronic controller 62 includes a processor that executes a predetermined control program. The processor of the electronic controller 62 includes, for example, a CPU or an MPU. Thus, the controller 62 includes at least one processor 62A. The electronic controller 62 can include processors provided at positions separate from each other. The electronic controller 62 can include one or more microcomputers. Preferably, the control device 60 further includes storage 64. The storage 64 stores various control programs and information used for various control processes. The storage 64 is any computer storage device or any non-transitory computer-readable medium with the sole exception of a transitory, propagating signal. For example, the storage 64 includes a nonvolatile memory and a volatile memory.

Preferably, the control device 60 further includes a drive circuit 66 of the motor 40. Preferably, the drive circuit 66 and the electronic controller 62 are provided on the housing 42A of the drive unit 42. The drive circuit 66 and the electronic controller 62 can be provided, for example, on the same circuit substrate. The drive circuit 66 includes an inverter circuit. The drive circuit 66 controls electric power supplied from the battery 36 to the motor 40. The drive circuit 66 is connected to the electronic controller 62 by a conductive wire, an electric cable, or a wireless communication device. The drive circuit 66 drives the motor 40 in accordance with a control signal from the electronic controller 62.

The human-powered vehicle 10 further includes various sensor that detect various running conditions of the human-powered vehicle 10. The term "sensor" as used herein refers to a hardware device or instrument designed to detect the presence or absence of a particular event, object, substance, or a change in its environment, and to emit a signal in response. The term "sensor" as used herein does not include a human. Preferably, the human-powered vehicle 10 further includes a vehicle speed sensor 44. Preferably, the human-powered vehicle 10 further includes at least one of a crank rotation sensor 46 and a human driving force detector 48.

The vehicle speed sensor 44 is configured to detect information related to a vehicle speed V of the human-powered vehicle 10. In the present embodiment, the vehicle speed sensor 44 is configured to detect information related to a rotational speed W of at least one wheel 14 of the human-powered vehicle 10. The vehicle speed sensor 44 is configured to, for example, a magnet provided on at least one wheel 14 of the human-powered vehicle 10. The vehicle speed sensor 44 is configured to, for example, output a detection signal a predetermined number of times while one of the at least one wheel 14 performs one rotation. The predetermined number of times is, for example, one. The vehicle speed sensor 44 outputs a signal corresponding to the rotational speed W of the wheel 14. The electronic controller 62 calculates a vehicle speed V of the human-powered vehicle 10 based on the rotational speed W of the wheel 14 and information related to the perimeter of the wheel 14. The information related to the perimeter of the wheel 14 is stored in the storage 64.

The vehicle speed sensor 44 includes, for example, a magnetic reed forming a reed switch or a Hall element. The vehicle speed sensor 44 can be attached to a chainstay of the frame 18 of the human-powered vehicle 10, and is configured to detect a magnet attached to the rear wheel 14A. Alternatively, the vehicle speed sensor 44 can be provided on the front fork 30, and is configured to detect a magnet attached to the front wheel 14B. In the present embodiment, the vehicle speed sensor 44 is configured so that the reed switch detects the magnet once in one rotation of the wheel 14. The vehicle speed sensor 44 can have any configuration that obtains information related to the vehicle speed V of the human-powered vehicle 10. The vehicle speed sensor 44 is not limited to a configuration that detects a magnet provided on the wheel 14 and can, for example, be configured to detect a slit provided on a disc brake, include an optical sensor, or include a global positioning system (GPS) receiver. The vehicle speed sensor 44 is connected to the electronic controller 62 by a wireless communicator or an electric cable.

The crank rotation sensor 46 is configured to detect information related to a rotational speed C of the input rotational shaft 12A. The crank rotation sensor 46 is provided, for example, on the frame 18 of the human-powered vehicle 10 or the drive unit 42. The crank rotation sensor 46 can be provided on the housing 42A of the drive unit 42. The crank rotation sensor 46 is configured to include a magnetic sensor that outputs a signal corresponding to the strength of a magnetic field. An annular magnet having a magnetic field, the strength of which changes in the circumferential direction, is provided on the input rotational shaft 12A, a member that rotates in cooperation with the input rotational shaft 12A, or a power transmission path extending between the input rotational shaft 12A and the first rotary body 24. The member that rotates in cooperation with the input rotational shaft 12A can include an output shaft of the motor 40.

The crank rotation sensor 46 outputs a signal corresponding to the rotational speed C of the input rotational shaft 12A. The magnet can be provided on a member that rotates integrally with the input rotational shaft 12A in the power transmission path of human driving force H between the input rotational shaft 12A and the first rotary body 24. For example, in a case where the first one-way clutch is not provided between the input rotational shaft 12A and the first rotary body 24, the magnet can be provided on the first rotary body 24. The crank rotation sensor 46 can have any configuration that obtains information related to the rotational speed C of the input rotational shaft 12A and can include an optical sensor, an acceleration sensor, a gyro sensor, or a torque sensor instead of a magnetic sensor. The crank rotation sensor 46 is connected to the electronic controller 62 by a wireless communicator or an electric cable.

The human driving force detector 48 is configured to detect information related to the human driving force H. The human driving force detector 48 is provided, for example, on the frame 18 of the human-powered vehicle 10, the drive device 42, the crank 12, or the pedals 20. The human driving force detector 48 can be provided on the housing 42A of the drive device 42. The human driving force detector 48 includes, for example, a torque sensor. The torque sensor is configured to output a signal corresponding to torque applied to the crank 12 by the human driving force H. For example, in a case where the first one-way clutch is provided on the power transmission path, it is preferred that the torque sensor is provided at the upstream side of the first one-way clutch in the power transmission path. The torque sensor includes, for example, a strain sensor, a magnetostrictive sensor, or a pressure sensor. The strain sensor includes a strain gauge.

The torque sensor is provided on a member included in the power transmission path or a member near the member included in the power transmission path. The member included in the power transmission path includes, for example, the input rotational shaft 12A, a member that transmits the human driving force H between the input rotational shaft 12A and the first rotary body 24, the crank arms 12B, and the pedals 20. The torque sensor is connected to the electronic controller 62 by a wireless communicator or an electric cable. The human driving force detector 48 can have any configuration that obtains information related to the human driving force H and can include, for example, a sensor that detects pressure applied to the pedals 20 or a sensor that detects tension of a chain.

Preferably, the electronic controller 62 is configured to control the motor 40 in accordance with human driving force H that is input to the human-powered vehicle 10. The human driving force H can be expressed as torque or power. The electronic controller 62 is configured to control the motor 40, for example, so that the ratio of assist force produced by the motor 40 to the human driving force H equals a predetermined ratio A. The human driving force H corresponds to a propulsion force of the human-powered vehicle 10 that is generated by the user rotating the crank 12. The assist force corresponds to a propulsion force of the human-powered vehicle 10 that is generated by rotation of the motor 40. The predetermined ratio A does not have to be fixed and can change, for example, in accordance with the human driving force H, the vehicle speed V, or both human driving force H and the vehicle speed V.

In a case where the human driving force H and the assist force are expressed as torque, the human driving force H is referred to as a human torque HT, and the assist force is referred to as assist torque MT. In a case the human driving force H and the assist force are expressed as power, the human driving force H is referred to as a human power HW, and the assist force is referred to as an assist power MW. The ratio A can be a torque ratio of the assist torque MT to the human torque HT of the human-powered vehicle 10 or can be a ratio of the assist power MW of the motor 40 to the human power HW.

In the drive unit 42 of the present embodiment, the crank 12 is connected to the first rotary body 24 without using the shifting device, and an output of the motor 40 is input to the first rotary body 24. In a case where the crank 12 is connected to the first rotary body 24 without using the shifting device and the output of the motor 40 is input to the first rotary body 24, the human driving force H corresponds to a driving force that is generated by the user rotating the crank 12, and is input to the first rotary body 24. In a case where the crank 12 is connected to the first rotary body 24 without using the shifting device and the output of the motor 40 is input to the first rotary body 24, the assist force corresponds to a driving force that is generated by rotation of the motor 40, and is input to the first rotary body 24. In a case where the output of the motor 40 is input to the first rotary body 24 through a speed reducer, the assist force corresponds to an output of the speed reducer.

In the present embodiment, the human torque HT is torque that is input to the first rotary body 24 from the crank 12. In the present embodiment, the human power HW is power that is input to the first rotary body 24 from the crank 12. In the present embodiment, the assist torque MT is torque that is input to the first rotary body 24 from the motor 40. In the present embodiment, the assist power MW is power that is input to the first rotary body 24 from the motor 40. In the present embodiment, the human power HW is calculated, for example, by multiplying the human torque HT and the rotational speed C of the input rotational shaft 12A. In the present embodiment, in a case where the output of the motor 40 is input to the first rotary body 24 without using the speed reducer, the assist power MW is calculated, for example, by multiplying output torque of the motor 40 and rotational speed of the motor 40. In the present embodiment, in a case where the output of the motor 40 is input to the first rotary body 24 through the speed reducer, the assist power MW is calculated, for example, by multiplying output torque of the speed reducer and output rotational speed of the speed reducer.

The storage 64 stores, for example, at least one of first information indicating a relationship between a control instruction of the motor 40 or the rotational speed of the motor 40 and the output torque of the motor 40 and second information indicating a relationship between the control instruction of the motor 40 or the rotational speed of the motor 40 and the output torque of the speed reducer. Preferably, the motor 40 is provided with a motor rotational speed sensor configured to detect the rotational speed of the motor 40. The motor rotational speed sensor is, for example, electrically connected to the electronic controller 62 and outputs a signal corresponding to the rotational speed of the motor 40 to the electronic controller 62.

The electronic controller 62 calculates the output torque of the motor 40, for example, in accordance with the first information and the control instruction of the motor 40 or the rotational speed of the motor 40. The electronic controller 62 calculates the output torque of the speed reducer, for example, in accordance with the second information and the control instruction of the motor 40 or the rotational speed of the motor 40. The electronic controller 62 is configured to output the control instruction to the drive circuit 66 of the motor 40 in accordance with the human torque HT or the human power HW. The control instruction includes, for example, a torque instruction value.

In a case where the motor 40 is provided on the rear wheel 14A, the human driving force H corresponds to an output of the rear wheel 14A driven by only the user. In a case where the motor 40 is provided on the rear wheel 14A, assist force corresponds to an output of the rear wheel 14A driven by only the motor 40. In a case where the motor 40 is provided on the front wheel 14B, the human driving force H corresponds to an output of the rear wheel 14A driven by only the user. In a case where the motor 40 is provided on the front wheel 14B, assist force corresponds to an output of the front wheel 14B driven by only the motor 40.

The electronic controller 62 is configured to control the motor 40 so that the assist force becomes less than or equal to an upper limit value MX. In a case where the output of the motor 40 is input to the first rotary body 24 and the assist force is expressed as torque, the electronic controller 62 is configured to control the motor 40 so that the assist torque MT becomes less than or equal to an upper limit value MTX. Preferably, the upper limit value MTX is in a range of 20 Nm or greater and 200 Nm or less. The upper limit value MTX is, for example, 30 Nm. The upper limit value MTX is specified, for example, by an output property of the motor 40. In a case where the output of the motor 40 is input to the first rotary body 24 and the assist force is expressed as power, the electronic controller 62 is configured to control the motor 40 so that the assist power MW becomes less than or equal to an upper limit value MWX.

Preferably, the electronic controller 62 is configured to change a change ratio P of a change rate of the output of the motor 40 to a change rate of the human driving force H. Preferably, the change ratio P includes at least one of a first change rate P1 corresponding to an increase in the human driving force H and a second change ratio P2 corresponding to a decrease in the human driving force H.

The electronic controller 62 changes the first change rate P1 using, for example, a first filter. The first filter includes, for example, a first time constant. The electronic controller 62 changes the first time constant of the first filter to change the first change rate P1. The electronic controller 62 can change a gain for calculating the output of the motor 40 from the human driving force H to change the first change rate P1. The first filter is, for example, implemented by executing software predetermined in a processor.

The electronic controller 62 changes the second change ratio P2 using, for example, a second filter. The second filter includes, for example, a second time constant. The electronic controller 62 changes the second time constant of the second filter to change the second change ratio P2. The electronic controller 62 can change a gain for calculating the output of the motor 40 from the human driving force H to change the second change ratio P2. The second filter is, for example, implemented by executing software predetermined in a processor.

The electronic controller 62 is configured to control the electric component 38 of the human-powered vehicle 10 in at least one control state selected from multiple control states that at least partially differ from each other. In a case where the electric component 38 includes the motor 40, the at least one control state relates to control of the motor 40. Preferably, the multiple control states differ in at least one of the ratio A of the assist force produced by the motor 40 to the human driving force H input to the human-powered vehicle 10, an upper limit value MX of the output of the motor 40, and the change ratio P of the change rate of the output of the motor 40 to the change rate of the human driving force H. Each of the multiple control states corresponds to a control mode that is selectable by a user.

Preferably, the multiple control states differ from each other in the ratio A in a case where the assist force is less than the upper limit value MX. Preferably, the ratio A increases as the human driving force H increases. In a case where the assist force is less than the upper limit value MX, the ratio A increases as the human driving force H increases. Preferably, in each control state, until the assist force reaches the upper limit value MX, as the human driving force H increases, the ratio A increases as a curve so that the increase rate of the assist force increases. In each control state, in a case where the assist force is less than the upper limit value MX, the ratio A can increase linearly as the human driving force H increases. Preferably, in the multiple control states, all of the ratios A increase as a curve so that the increase rate of the assist force increases as the human driving force H increases in a case where the assist force is less than the upper limit value MX. Alternatively, in the multiple control states, all of the ratios A increase linearly as the human driving force H increases in a case where the assist force is less than the upper limit value MX.

The control device 60 further includes a first storage 68. The first storage 68 is configured to store first control information related to the at least one control state. One control state is associated with, for example, at least one control parameter. The first control information includes, for example, at least one control parameter. The first storage 68 stores at least one control parameter. The first storage 68 is any computer storage device or any non-transitory computer-readable medium with the sole exception of a transitory, propagating signal. For example, the storage 68 includes a nonvolatile memory. The nonvolatile memory of the first storage 68 includes, for example, at least one of a ROM, an EPROM, an EEPROM, and a flash memory. Preferably, at least part of the first storage 68 is configured integrally with the storage 64.

The electronic controller 62 controls the electric component 38 in accordance with the first control information. In a case where the first control information corresponds to two or more control states, the electronic controller 62 controls the electric component 38 in accordance with one control state selected from the two or more control states. For example, in a case where the electric component 38 includes the motor 40 and the first control information corresponds to two or more control states that differ in the ratio A, the electronic controller 62 controls the motor 40 in accordance with the ratio A associated with a selected one of the control states.

In a case where the first control information corresponds to two or more control states, it is preferred that two or more control parameters included in the first control information are associated with predetermined order information and stored in the first storage 68. Table 1 shows an example of the first control information.

TABLE 1

| | Predetermined Order Information | Control Parameter Corresponding to Control State |
|---|---|---|
| 1st Control Information | 7 | Control parameter corresponding to 1st control state |
| | 6 | Control parameter corresponding to 3rd control state |
| | 5 | Control parameter corresponding to 5th control state |
| | 4 | Control parameter corresponding to 7th control state |
| | 3 | Control parameter corresponding to 9th control state |
| | 2 | Control parameter corresponding to 11th control state |
| | 1 | Control parameter corresponding to 15th control state |

Table 1 shows the relationship between the predetermined order information and the control parameters. Table 1 shows a case in which the two or more control states include seven control states. In Table 1, the predetermined order information is expressed by numerals. In a case where the first control information corresponds to only one control state, the predetermined order information is omitted.

Table 2 shows an example of the control states and the ratio A in each control state. Table 2 shows a case that A1>A3>A5>A7>A9>A11>A15.

TABLE 2

| Control State | Ratio A |
| --- | --- |
| 1st Control State | A1 |
| 3rd Control State | A3 |
| 5th Control State | A5 |
| 7th Control State | A7 |
| 9th Control State | A9 |
| 11th Control State | A11 |
| 15th Control State | A15 |

The predetermined order information is determined in accordance with, for example, the value of the ratio A. In a case where the two or more control states change from one control state to another control state, the electronic controller 62 changes the control state in accordance with the predetermined order information. The first control information includes the predetermined order information and control parameters corresponding to the two or more control states. In Table 1, the predetermined order information includes numerals that are smaller as the ratio A in the control state corresponding to the control parameter decreases. The predetermined order information can be information other than numerals as long as the order is expressed. In a case where the predetermined order information is a numeral, the electronic controller 62 changes the control state in accordance with the numeral order. The predetermined order information can be associated in advance with the control parameter corresponding to each control state. The predetermined order information of the control state included in the first control information can include non-consecutive numerals excluding overlapping numerals.

The control system 50 further includes, for example, a fifth operating device 58. The fifth operating device 58 is provided, for example, on the handlebar 34. Preferably, the fifth operating device 58 includes a first operating portion 58A and a second operating portion 58B. In a case where the first control information relates to two or more pieces of the control information and the user operates the first operating portion 58A, the electronic controller 62 changes the control state in accordance with a first order. The second operating portion 58B includes a button operable by a hand of the user. In a case where the first control information relates to two or more pieces of the control information and the user operates the second operating portion 58B, the electronic controller 62 changes the control state in accordance with a second order.

In the first order, for example, the ratio A increases. In the second order, for example, the ratio A decreases. The first order corresponds to an order from a small numeral to a large numeral in the predetermined order information. The second order corresponds to an order from a large numeral to a small numeral in the predetermined order information. The fifth operating device 58 can include a third operating portion 58C. In the present embodiment, the third operating portion 58C is configured, for example, to switch between a state in which the electric component 38 is activated and a state in which the electric component 38 is stopped. Preferably, the first operating portion 58A, the second operating portion 58B, and the third operating portion 58C include a switch operable by a hand of the user or a button operable by a hand of the user. Each of the first operating portion 58A and the second operating portion 58B can include a lever member operable by a hand of the user.

Figure 4:
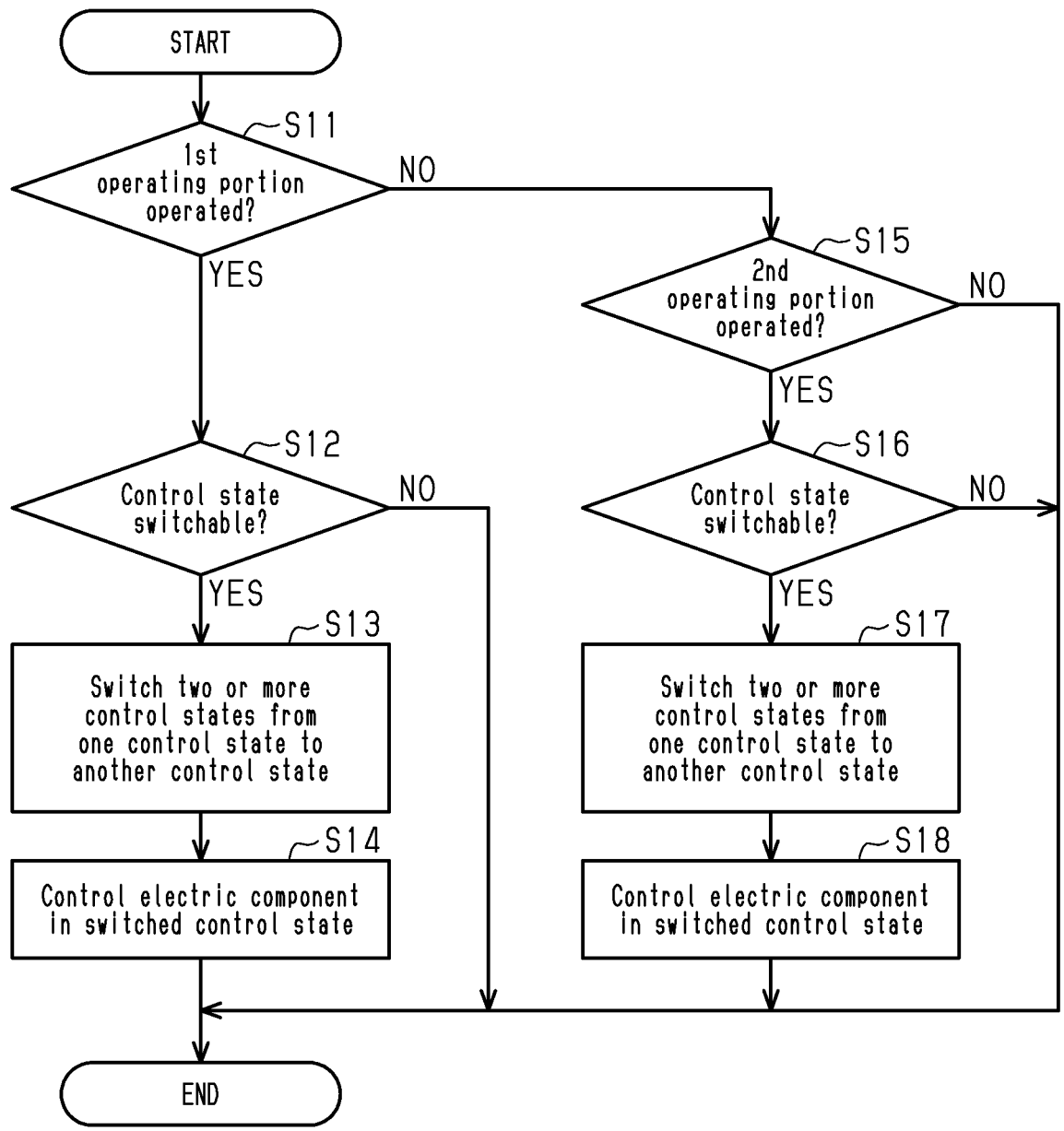
FIG. 4 is a flowchart of a process executed by the electronic controller shown in FIG. 2 for controlling an electric component.

A process for switching the control state that controls the electric component 38 with the electronic controller 62 will now be described with reference to FIG. 4. In a case where electric power is supplied to, for example, the electronic controller 62, the electronic controller 62 starts the process and proceeds to step S11 of the flowchart shown in FIG. 4. In a case where the flowchart shown in FIG. 4 ends, the electronic controller 62 repeats the process from step S11 after a predetermined interval, for example, until the supply of electric power stops.

In step S11, the electronic controller 62 determines whether the first operating portion 58A is operated. In a case where the first operating portion 58A is operated, the electronic controller 62 proceeds to step S12. In step S12, the electronic controller 62 determines whether the control state is switchable. For example, in a case where the first control information corresponds to two or more pieces of control information and the ratio A corresponding to the present control state is not the largest ratio A in the two or more control states corresponding to the first control information, the electronic controller 62 determines that the control state is switchable. In a case where the control state is not switchable, the electronic controller 62 ends the process. For example, in a case where the first control information corresponds to only one piece of control information, the electronic controller 62 determines in step S12 that the control state is not switchable. In a case where the control state is switchable, the electronic controller 62 proceeds to step S13.

In step S13, the electronic controller 62 switches the control state from one control state to another control state in the two or more control states and then proceeds to step S14. The electronic controller 62 switches the control state, for example, in the first order. In step S14, the electronic controller 62 controls the electric component 38 in the switched control state and then ends the process.

In step S11, in a case where the first operating portion 58A is not operated, the electronic controller 62 proceeds to step S15. In step S15, the electronic controller 62 determines whether the second operating portion 58B is operated. In a case where the second operating portion 58B is not operated, the electronic controller 62 ends the process. In a case where the second operating portion 58B is operated, the electronic controller 62 proceeds to step S16. In step S16, the electronic controller 62 determines whether the control state is switchable. For example, in a case where the first control information corresponds to two or more pieces of control information and the ratio A corresponding to the present control state is not the smallest ratio A in the two or more of the at least one control state corresponding to the first control information, the electronic controller 62 determines that the control state is switchable. In a case where the control state is not switchable, the electronic controller 62 ends the process. For example, in a case where the first control information corresponds to only one piece of control information, the electronic controller 62 determines in step S16 that the control state is not switchable. In a case where the control state is switchable, the electronic controller 62 proceeds to step S17.

In step S17, the electronic controller 62 switches the control state from one control state to another control state of the two or more control states and then proceeds to step S18. The electronic controller 62 switches the control state, for example, in the second order. In step S18, the electronic controller 62 controls the electric component 38 in the switched control state and then ends the process.

In a case where the at least one control state is one control state and the first operating portion 58A or the second operating portion 58B is operated, the electronic controller 62 does not switch the control state. In a case where the at least one control state is one control state, in step S12, the electronic controller 62 determines that the control state is not switchable. In a case where the at least one control state is one control state, in step S16, the electronic controller 62 determines that the control state is not switchable. In a case where the at least one control state is one control state, the electronic controller 62 can be configured not to execute the process shown in the flowchart of FIG. 4. In this case, for example, in a case where the electric component 38 is activated by operation of the third operating portion 58C, the electric component 38 is driven in the one control state.

Preferably, the control device 60 further includes a communication device 74. The communication device 74 is configured to communicate with the external device 80. Preferably, the communication device 74 is connected so as to perform at least one of wired communication or wireless communication with a communication device 86 of the external device 80. The wireless communication method is not particularly limited. The wireless communication method includes, for example, at least one of Bluetooth (registered trademark), radio frequency identification (RFID), and ANT+ (registered trademark). The communication device 74 includes at least one of a communication connector and a wireless communicator. The communication device 74 is electrically connected to the electronic controller 62. The electronic controller 62 is configured to communicate with the external device 80 via the communication device 74.

The method for setting the control state of the control device 60 includes changing the number of at least one control state. The number of at least one control state is changeable. The first control information stored in the first storage 68 is configured to be change in accordance with operation of the first operating device 54. Preferably, the electronic controller 62 changes the first control information stored in the first storage 68 in accordance with operation of the first operating device 54. For example, in a case where the communication device 74 receives an instruction signal that changes the first control information from the communication device 86 of the external device 80 in accordance with operation of the first operating device 54, the electronic controller 62 changes the first control information stored in the first storage 68.

Preferably, the control device 60 further includes a second storage 70. The second storage 70 is configured to store second control information related to the multiple control states. The first control information includes at least some of the second control information. The second storage 70 is any computer storage device or any non-transitory computer-readable medium with the sole exception of a transitory, propagating signal. For example, the storage 70 includes, a nonvolatile memory. The nonvolatile memory of the second storage 70 includes, for example, at least one of a ROM, an EPROM, an EEPROM, and a flash memory. Preferably, at least part of the second storage 70 is configured integrally with the storage 64. The second control information includes, for example, multiple control parameters.

Preferably, the electronic controller 62 is configured to change the first control information stored in the first storage 68 using the second control information. Preferably, the multiple control parameters included in the second control information are associated with predetermined identification information and stored in the second storage 70. Table 3 shows an example of the second control information.

TABLE 3

| | Identification Information | Control Parameter Corresponding to Control State |
|---|---|---|
| 2nd Control Information | 15 | Control parameter corresponding to 1st control state |
| | 14 | Control parameter corresponding to 2nd control state |
| | 13 | Control parameter corresponding to 3rd control state |
| | 12 | Control parameter corresponding to 4th control state |
| | 11 | Control parameter corresponding to 5th control state |
| | 10 | Control parameter corresponding to 6th control state |
| | 9 | Control parameter corresponding to 7th control state |
| | 8 | Control parameter corresponding to 8th control state |
| | 7 | Control parameter corresponding to 9th control state |
| | 6 | Control parameter corresponding to 10th control state |
| | 5 | Control parameter corresponding to 11th control state |
| | 4 | Control parameter corresponding to 12th control state |
| | 3 | Control parameter corresponding to 13th control state |
| | 2 | Control parameter corresponding to 14th control state |
| | 1 | Control parameter corresponding to 15th control state |

Table 3 shows the relationship between the identification information and the control parameter. Table 3 shows a case in which the multiple control states include fifteenth control states. In Table 3, the identification information is expressed by, for example, numerals.

Table 4 shows an example of the control states and the ratio A in each control state. Table 4 shows a case that A1>A2>A3>A4>A5>A6>A7>A8>A9>A10>A11>A12>A13>A14>A15.

TABLE 4

| Control State | Ratio A |
|---|---|
| 1st Control State | A1 |
| 2nd Control State | A2 |
| 3rd Control State | A3 |
| 4th Control State | A4 |
| 5th Control State | A5 |
| 6th Control State | A6 |
| 7th Control State | A7 |
| 8th Control State | A8 |
| 9th Control State | A9 |
| 10th Control State | A10 |
| 11th Control State | A11 |
| 12th Control State | A12 |
| 13th Control State | A13 |
| 14th Control State | A14 |
| 15th Control State | A15 |

In Tables 3 and 4, multiple pieces of the identification information include numerals that are smaller as the ratio A in the control state corresponding to the control parameter decreases. The identification information can be information other than numerals as long as the control parameter is identifiable.

For example, the user can operate the first operating device 54 to select at least one of the multiple control states corresponding to the second control information. The user can operate the first operating device 54 to select at least one of the multiple control parameters included in the second control information. The electronic controller 62 can change the first control information by storing at least one control parameter selected by the user corresponding to the at least one control state in the first storage 68.

The first control information can include at least one piece of the identification information corresponding to a selected one of the at least one control state instead of at least one control parameter. In this case, the electronic controller 62 obtains a control parameter corresponding to the identification information included in the first control information from the second control information and controls the electric component 38 in accordance with the obtained control parameter. Table 5 shows an example of the first control information including the identification information. Table 5 shows the relationship between the predetermined order information and the identification information. The electronic controller 62 sets predetermined order information, for example, for each selected one of the at least one control state in the order from the smallest piece of the identification information. In a case where the identification information includes numerals, the predetermined order information can be the same as the identification information.

TABLE 5

|  | Predetermined Order Information | Identification Information |
|---|---|---|
| 1st Control Information | 7 | 15 |
|  | 6 | 13 |
|  | 5 | 11 |
|  | 4 | 9 |
|  | 3 | 7 |
|  | 2 | 5 |
|  | 1 | 1 |

Figure 5:
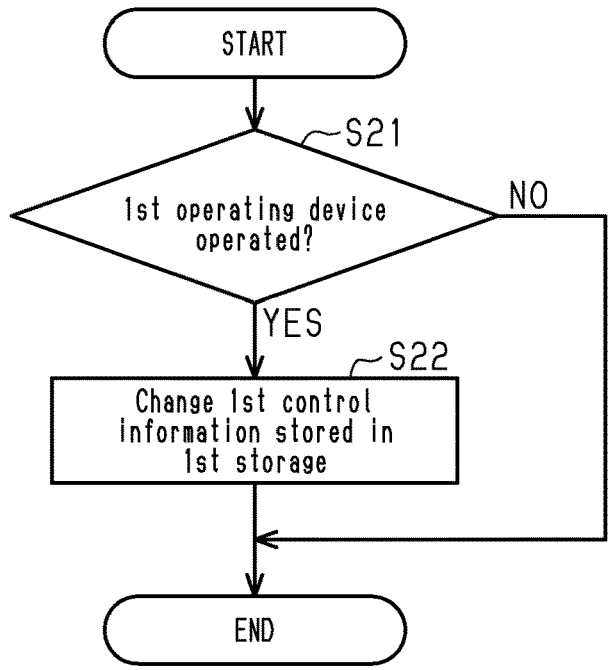
FIG. 5 is a flowchart of a process executed by the electronic controller shown in FIG. 2 for changing first control information in accordance with operation of a first operating device.

A process for changing the first control information with the electronic controller 62 will now be described with reference to FIG. 5. In a case where electric power is supplied to, for example, the electronic controller 62, the electronic controller 62 starts the process and proceeds to step S21 of the flowchart shown in FIG. 5. For example, in a case where the flowchart shown in FIG. 5 ends, the electronic controller 62 repeats the process from step S21 after a predetermined interval until the supply of electric power stops. The electronic controller 62 can be configured to start the process and proceed to step S21 of the flowchart shown in FIG. 5 in a case where a setting mode that changes the first control information is set. In this case, the electronic controller 62 can repeat the process from step S21 after a predetermined interval until the setting mode is cancelled.

In step S21, the electronic controller 62 determines whether the first operating device 54 is operated. In a case where the first operating device 54 is not operated, the electronic controller 62 ends the process. In step S22, the electronic controller 62 changes the first control information stored in the first storage 68 in accordance with operation of the first operating device 54 and then ends the process. The electronic controller 62 can store the first control information in the first storage 68 corresponding to any number of control states selected from the multiple control states by the user. The first control information can correspond to only one control state or two or more control states. In the present embodiment, in a case where the first control information corresponds to two or more control states, the control device can change the combination of the two or more control states corresponding to the first control information in accordance with the preference of user. In a case where the first control information corresponds to two or more control states, the electronic controller 62 can control the electric component 38 based on the combination of the two or more control states selected by the user.

The communication device 74 can be configured to receive the first control information from the external device 80, and the first storage 68 can be configured to change the first control information stored in the first storage 68 in accordance with the first control information received by the communication device 74. In this case, at least one of the second storage 70 and a third storage 72 can be omitted.

Figure 6:
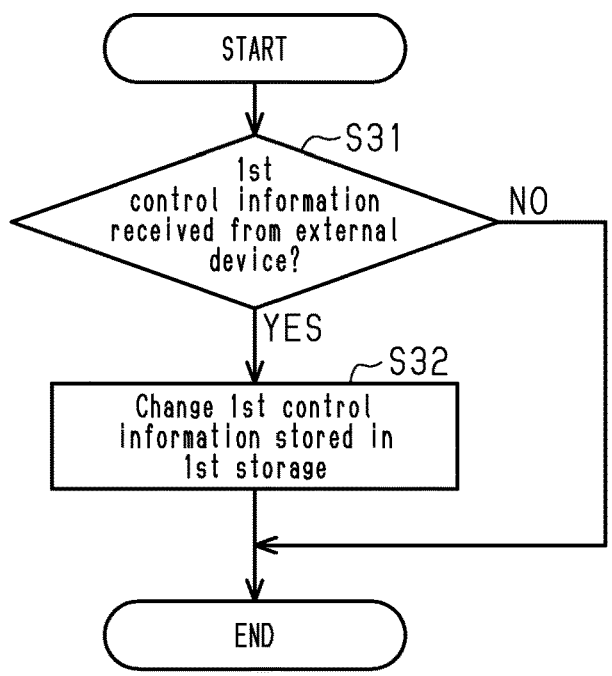
FIG. 6 is a flowchart of a process executed by the electronic controller shown in FIG. 2 for changing first control information in accordance with first control information received from an external device.

A process for changing the first control information in accordance with the first control information received from the external device 80 with the electronic controller 62 will now be described with reference to FIG. 6. In a case where electric power is supplied to the electronic controller 62, the electronic controller 62 starts the process and proceeds to step S31 of the flowchart shown in FIG. 6. In a case where the flowchart shown in FIG. 6 ends, the electronic controller 62 repeats the process from step S31 after a predetermined interval until the supply of electric power stops. The electronic controller 62 can be configured to start the process and proceed to step S31 of the flowchart shown in FIG. 6 in a case where a setting mode that changes the first control information is set. In this case, the electronic controller 62 can repeat the process from step S31 after a predetermined interval until the setting mode is cancelled.

In step S31, the electronic controller 62 determines whether the first control information is received from the external device 80. In a case where the first control information is not received from the external device 80, the electronic controller 62 ends the process. In a case where the first control information is received from the external device 80, the electronic controller 62 proceeds to step S32. In step S32, the electronic controller 62 changes the first control information stored in the first storage 68 to the first control information received from the external device 80 and then ends the process. For example, in step S32, the electronic controller 62 overwrites the first control information of the first storage 68 with the first control information received from the external device 80.

The second storage 70 can be configured to store fifth control information related to at least one or more control states of the multiple control states. Preferably, the electronic controller 62 is configured to control the electric component 38 in accordance with the fifth control information. For example, the electronic controller 62 overwrites the first control information with the fifth control information in accordance with operation of the first operating device 54. The fifth control information corresponds to, for example, the first control information that is in an initial set state. After the first control information is changed in accordance with operation of the first operating device 54, the user can change the first control information to the fifth control information, for example, by performing a reset operation on the first operating device 54 or the fifth operating device 58.

Preferably, the display device 52 is configured to show display information corresponding to the multiple control states. In a case where the multiple control states differ from each other in the ratio A, the display information includes a graph showing the ratio A.

Figure 7:
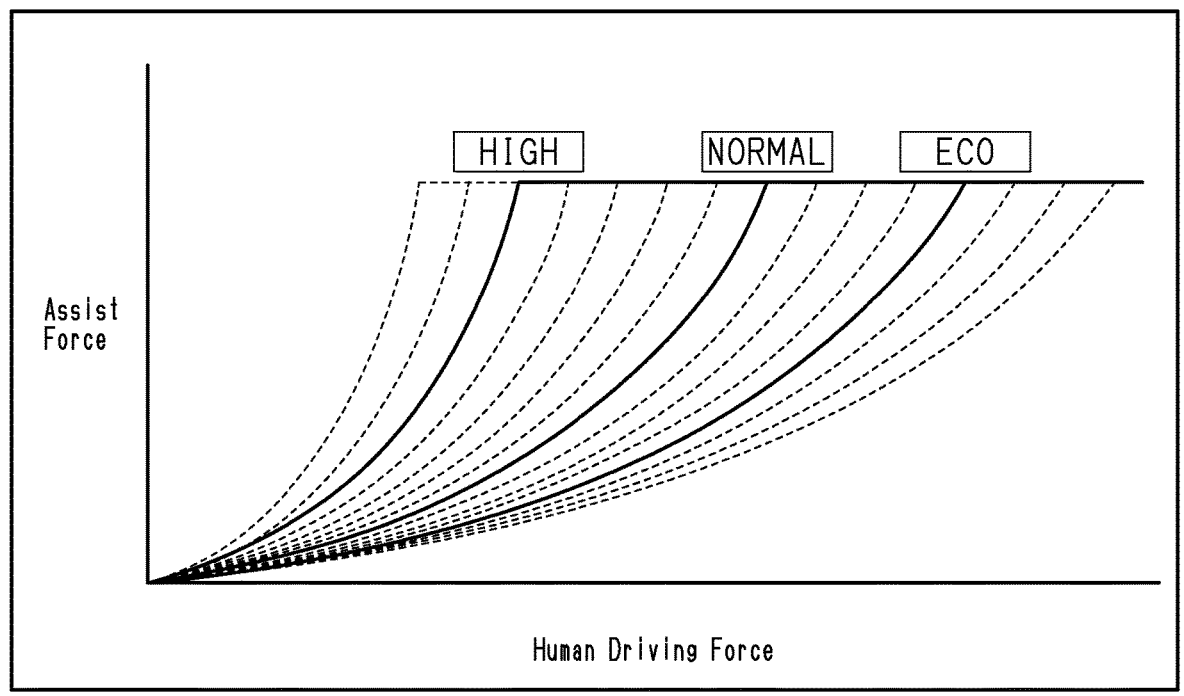
FIG. 7 is a schematic chart showing a first example of display information displayed on a display device of the control system for the human-powered vehicle.
Figure 8:
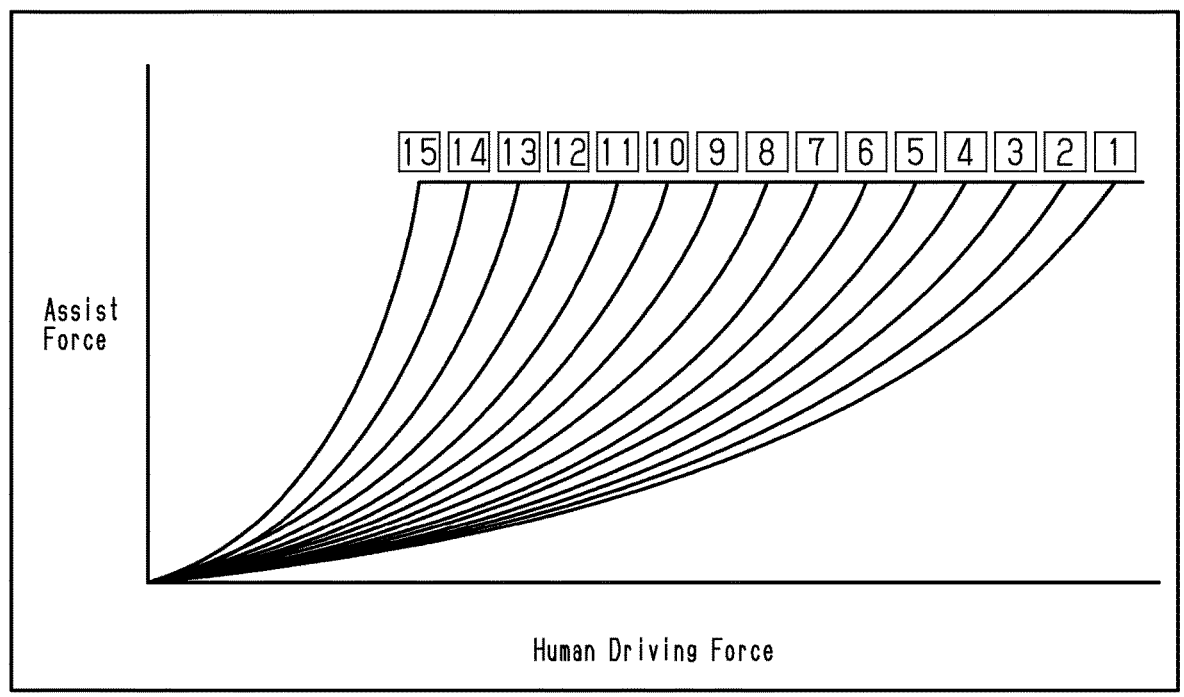
FIG. 8 is a schematic chart showing a second example of display information displayed on the display device of the control system for the human-powered vehicle.
Figure 9:
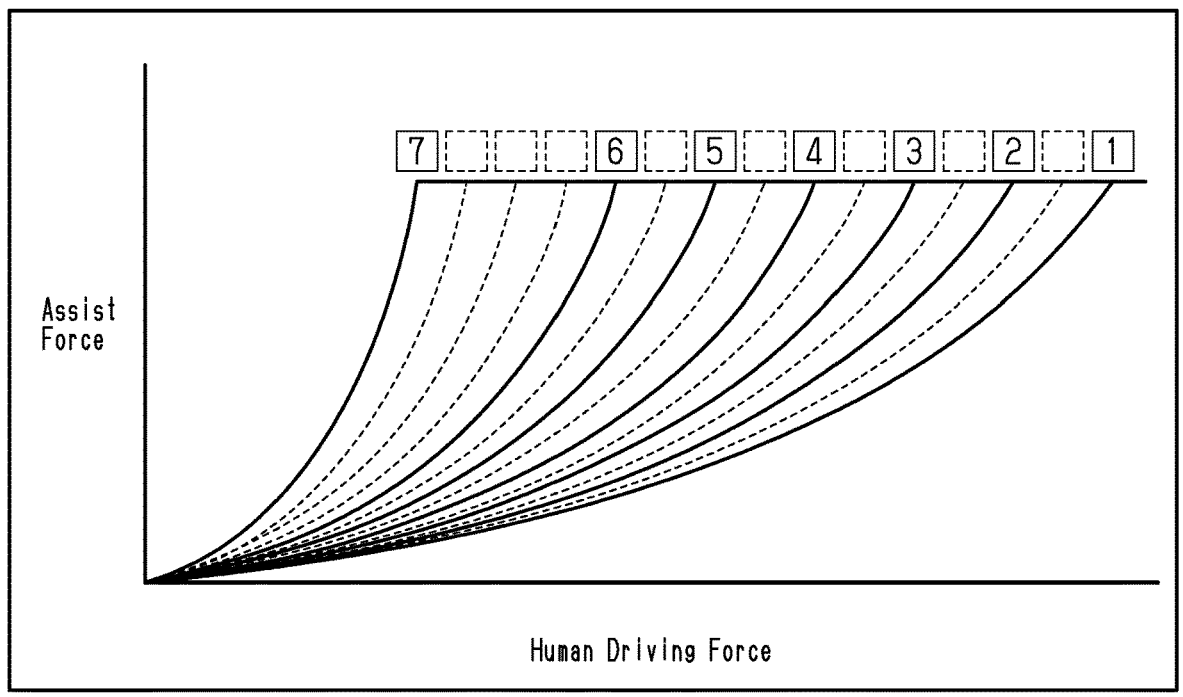
FIG. 9 is a schematic chart showing a third example of display information displayed on the display device of the control system for the human-powered vehicle.

FIGS. 7 to 9 show examples of the display information shown in the display device 52. In FIGS. 7 to 9, graphs corresponding to the multiple control states are associated with the predetermined order information and shown on the same plane. In a case where the multiple control states relate to the ratio A, axes of the graph shown in the display device 52 include an axis indicating human driving force and an axis indicating assist force. FIG. 8 shows first control information corresponding to the fifteen control states shown in Table 1. FIG. 9 shows first control information corresponding to seven control states. FIG. 7 shows first control information corresponding to three control states. FIG. 7 shows an example of third control information and fourth control information. In Table 7, instead of numerals, "ECO," "NORMAL," and "HIGH" are shown as the predetermined order information.

For example, a graph corresponding to the first control information and a graph that does not correspond to the first control information are distinguished from each other and shown in the display device 52. For example, the graph corresponding to the first control information can differ in color from the graph that does not correspond to the first control information. For example, the graph corresponding to the first control information can be indicated by a solid line, and the graph that does not correspond to the first control information can be indicated by a broken line.

The electronic controller 82 receives the first control information stored in the first storage 68 from the electronic controller 62 via the communication device 86. The electronic controller 82 shows the display information in the display device 52 in accordance with the received first control information. The user can recognize the control state corresponding to the presently set first control information by looking at the display device 52. Preferably, the user looks at the graph and operates the first operating device 54 to change the first control information. For example, the display device 52 shows all of the graphs corresponding to the multiple control states on the same plane. The display device 52 can show identification information corresponding to each graph. The display device 52 shows the identification information that is, for example, shown in Table 3.

The user operates the first operating device 54 to select or unselect, for example, at least one of the graphs or at least one piece of the identification information corresponding to each graph. For example, in a case where the first operating device 54 includes a touchscreen, if a portion of the touchscreen showing a graph corresponding to the first control information is touched, the graph shown on the touched portion is unselected, and if a portion of the touchscreen showing a graph that does not correspond to the first control information is touched, the graph shown on the touched portion is selected.

The electronic controller 62 changes the first control information of the first storage 68 in accordance with a selected graph, an unselected graph, selected identification information, or unselected identification information. The electronic controller 62 can change the first control information immediately after the first operating device 54 selects a graph or identification information. In a case where the first operating device 54 selects a graph, the electronic controller 82 stores the control parameter corresponding to the selected graph or the identification information corresponding to the selected graph in the storage 84 or the storage 64. In a case where information for completing the setting is input to the first operating device 54, the electronic controller 82 changes the first control information in accordance with the identification information stored in the storage 84 or the storage 64. Operation of the first operating device 54 changes the first control information to first control information corresponding to one or more control states that are desired by the user. This allows the user to drive the human-powered vehicle 10 using the desired number of control modes.

Second Embodiment

Figure 10:
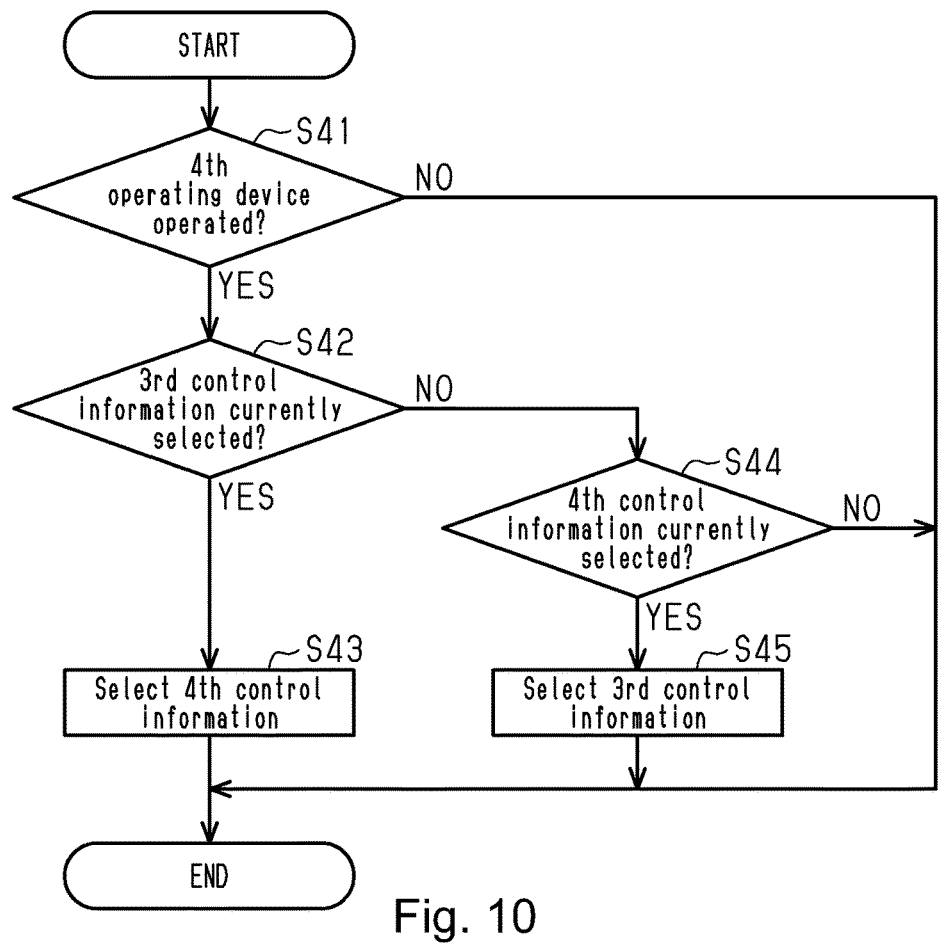
FIG. 10 is a flowchart of a process executed by an electronic controller of the second embodiment for switching between third control information and fourth control information in accordance with operation of a fourth operating device.
Figure 11:
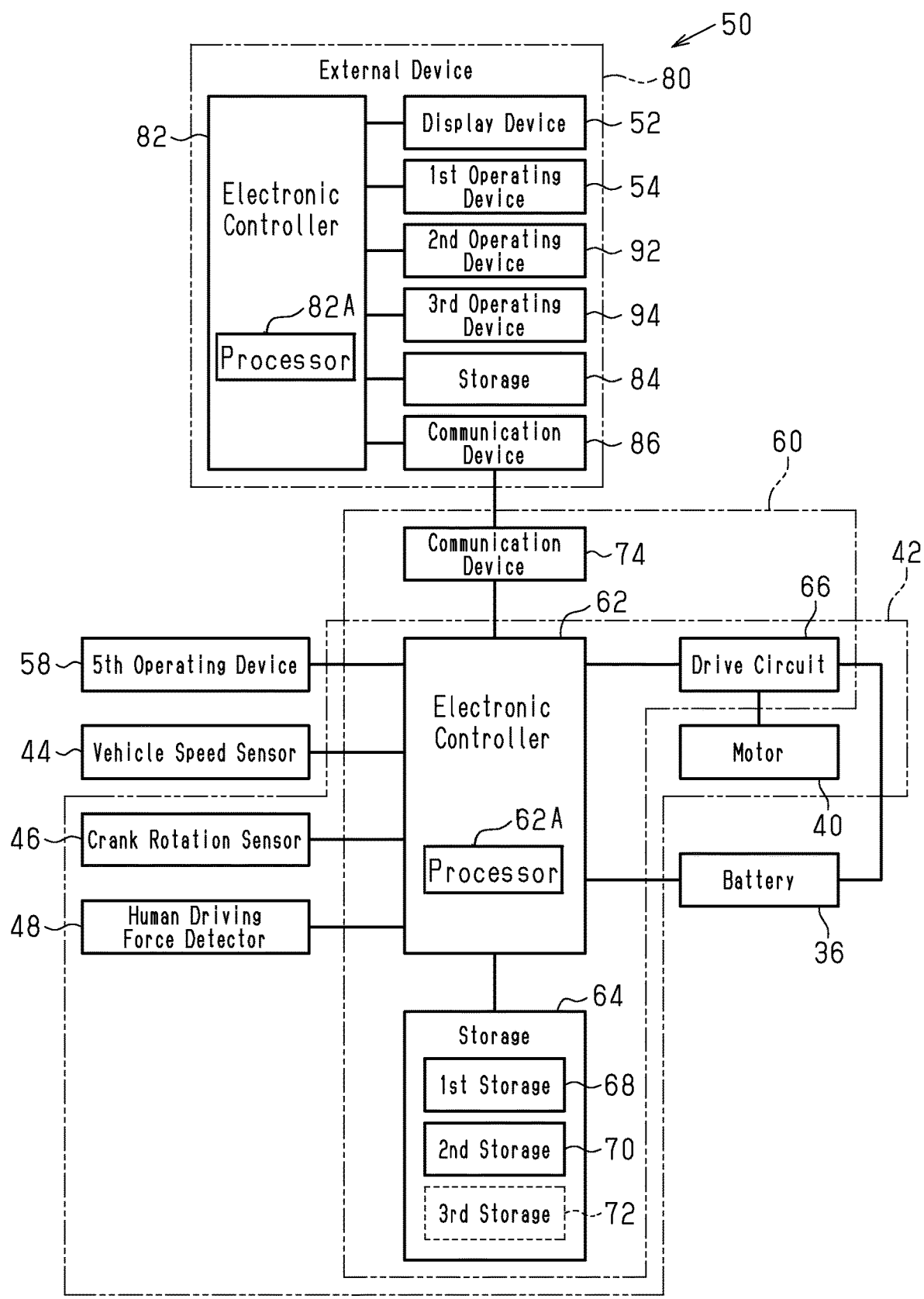
FIG. 11 is a block diagram showing an electrical configuration a control device for the human-powered vehicle and a control system for the human-powered vehicle in accordance with a third embodiment.

A second embodiment of a control device 60 will now be described with reference to FIGS. 2 and 10. The control device 60 of the second embodiment has the same configuration as the control device 60 of the first embodiment except that the process of the flowchart shown in FIG. 10 is executed instead of the process of the flowcharts shown in FIGS. 5 and 6. In the control device 60 of the second embodiment, same reference characters are given to those elements that are the same as the corresponding elements in the first embodiment. Such elements will not be described in detail.

Figure 2:
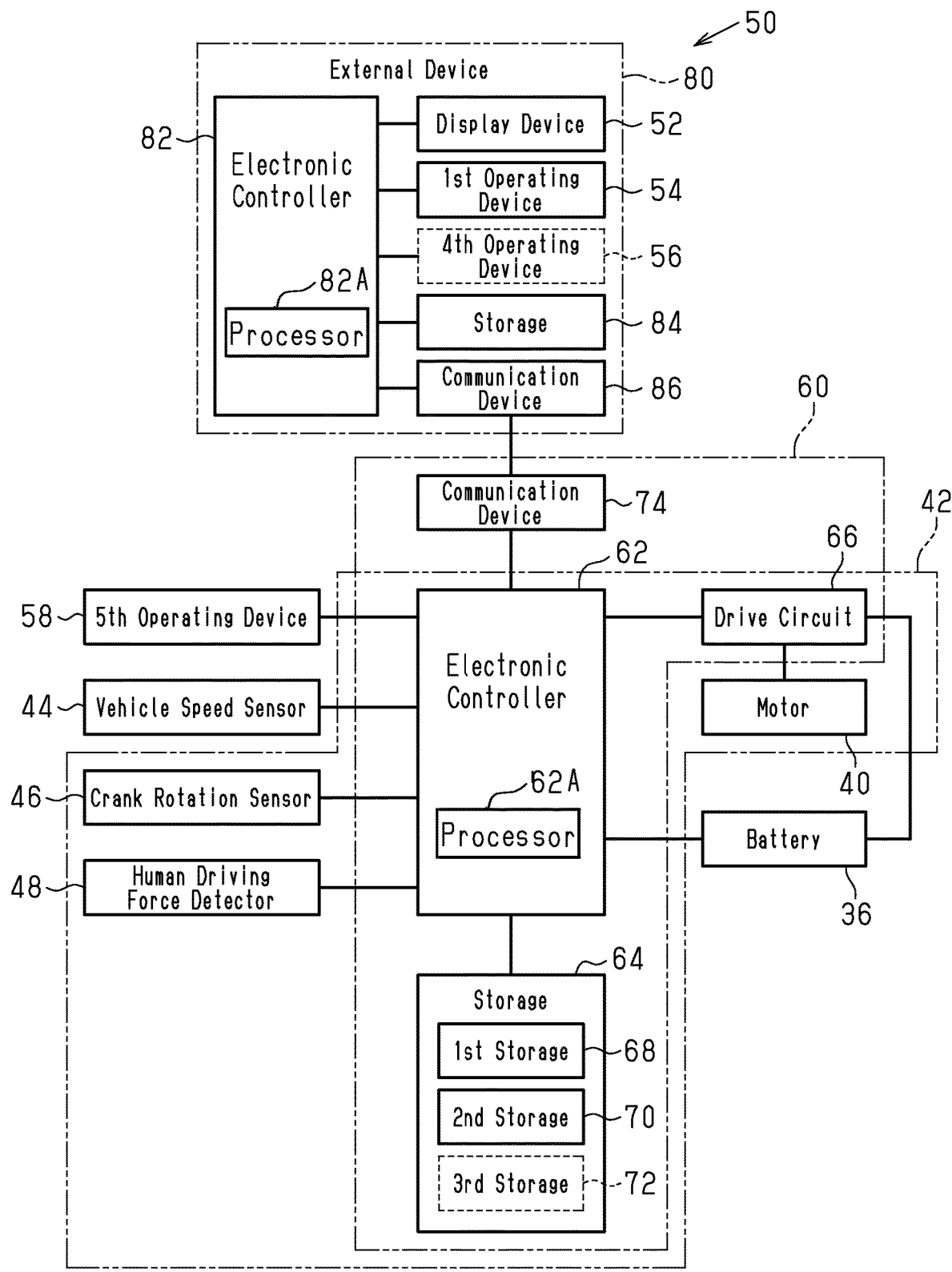
FIG. 2 is a block diagram showing an electrical configuration the control device for the human-powered vehicle and the control system for the human-powered vehicle illustrated in FIG. 1 accordance with a first embodiment as well as in accordance with a second embodiment.
Figure 3:
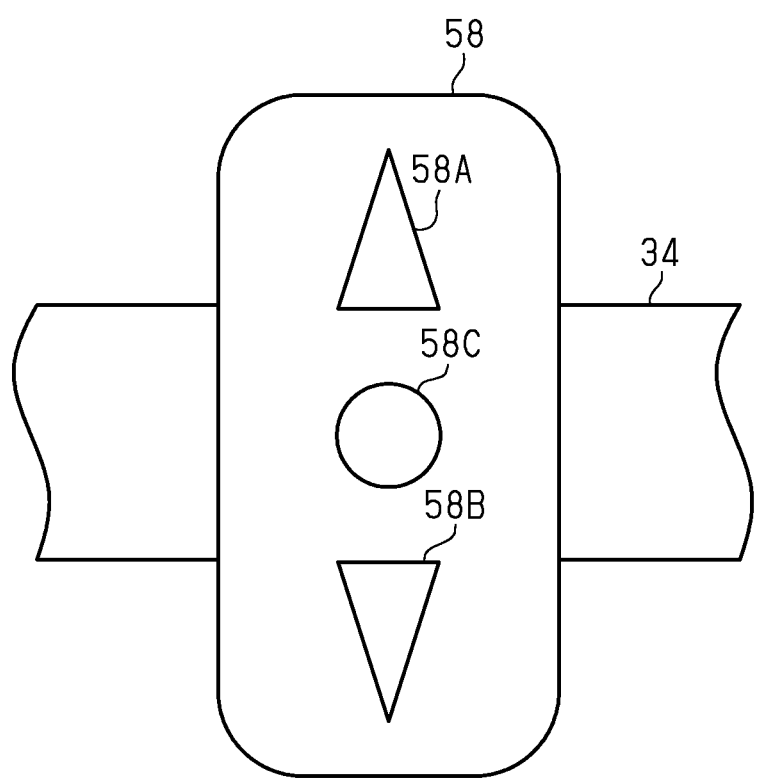
FIG. 3 is a partial plan view showing the third operating device shown in FIG. 2 and a handlebar.

In the second embodiment, the control device 60 further includes a third storage 72 that is indicated by broken lines in FIG. 2. The third storage 72 is configured to store the third control information related to two or more of the multiple control states and the fourth control information related to at least one or more of the multiple control states.

The third storage 72 is any computer storage device or any non-transitory computer-readable medium with the sole exception of a transitory, propagating signal. For example, the storage 72 includes a nonvolatile memory. The nonvolatile memory of the third storage 72 includes, for example, at least one of a ROM, an EPROM, an EEPROM, and a flash memory. Preferably, at least part of the third storage 72 is configured integrally with the storage 64. The third control information indicates a group including two or more control states. The fourth control information indicates a group including at least one or more control states.

In the second embodiment, the control system 50 further includes a fourth operating device 56 indicated by broken lines in FIG. 2. Preferably, the fourth operating device 56 is provided on the external device 80. The fourth operating device 56 includes at least one of a touchscreen, a mouse, a keyboard, and a button. The fourth operating device 56 can be configured by the first operating device 54.

Preferably, at least one of the two or more of the multiple control states related to the third control information differs from at least one of the at least one or more of the multiple control states related to the fourth control information. The electronic controller 62 is configured to control the electric component 38 in accordance with one selected from the third control information and the fourth control information. The electronic controller 62 is configured to control the electric component 38 in the two or more control states in a case where the third control information is selected. The electronic controller 62 controls the electric component 38 in the at least one or more of the control states in a case where the fourth control information is selected. Preferably, at least one of the third control information and the fourth control information is changeable. For example, the user can change the third control information in the same manner as the first control information. For example, the user can change the fourth control information in the same manner as the first control information. The electronic controller 62 is configured to select the third control information or the fourth control information in accordance with operation of the fourth operating device 56.

The electronic controller 62 can be configured to select the third control information or the fourth control information in accordance with operation of the fifth operating device 58 instead of or in addition to the fourth operating device 56. The electronic controller 62 can be configured to select the third control information or the fourth control information, for example, in a case where the third operating portion 58C of the fifth operating device 58 is operated. The electronic controller 62 can be configured to select the third control information or the fourth control information in a case where the third operating portion 58C of the fifth operating device 58 is operated for a predetermined time or longer. The electronic controller 62 can be configured to select the third control information or the fourth control information, for example, in a case where the first operating portion 58A of the fifth operating device 58 and the second operating portion 58B of the fifth operating device 58 are simultaneously operated. In a case where the third control information is selected, the electronic controller 62 changes the first control information in accordance with, for example, the third control information. In a case where the fourth control information is selected, the electronic controller 62 changes the third control information in accordance with, for example, the fourth control information.

The third control information is stored in the third storage 72 in association with the multiple control parameters corresponding to two or more of the multiple control states or multiple pieces of setting information corresponding to two or more of the multiple control states. The number of control states corresponding to the third control information can be fixed or can be changed in the same manner as the first control information. The fourth control information is stored in the third storage 72 in association with the control parameters corresponding to at least one or more of the multiple control states or multiple pieces of setting information corresponding to two or more of the multiple control states. The number of control states corresponding to the fourth control information can be fixed or can be changed in the same manner as the first control information. Preferably, at least one of the number of control states corresponding to the third control information and the number of control states corresponding to the fourth control information is changeable.

Table 6 shows an example of the third control information. Table 7 shows an example of the fourth control information. Table 8 shows another example of the third control information. Table 9 shows another example of the fourth control information.

TABLE 6

|  | Predetermined Order Information | Control Parameter Corresponding to Control State |
|---|---|---|
| 3rd Control Information | 7 | Control parameter corresponding to 1st control state |
|  | 6 | Control parameter corresponding to 3rd control state |
|  | 5 | Control parameter corresponding to 5th control state |
|  | 4 | Control parameter corresponding to 7th control state |
|  | 3 | Control parameter corresponding to 9th control state |

TABLE 6-continued

| Predetermined Order Information | Control Parameter Corresponding to Control State |
|---|---|
| 2 | Control parameter corresponding to 11th control state |
| 1 | Control parameter corresponding to 15th control state |

TABLE 7

|  | Predetermined Order Information | Control Parameter Corresponding to Control State |
|---|---|---|
| 4th Control Information | 3 | Control parameter corresponding to 4th control state |
|  | 2 | Control parameter corresponding to 8th control state |
|  | 1 | Control parameter corresponding to 13th control state |

TABLE 8

|  | Predetermined Order Information | Identification Information |
|---|---|---|
| 3rd Control Information | 7 | 15 |
|  | 6 | 13 |
|  | 5 | 11 |
|  | 4 | 9 |
|  | 3 | 7 |
|  | 2 | 5 |
|  | 1 | 1 |

TABLE 9

|  | Predetermined Order Information | Identification Information |
|---|---|---|
| 4th Control Information | 3 | 12 |
|  | 2 | 8 |
|  | 1 | 3 |

The graph corresponding to the third control information shown in Table 6 is the same as the graph corresponding to the first control information shown in FIG. 9. The graph corresponding to the fourth control information shown in Table 7 is the same as the graph corresponding to the first control information shown in FIG. 7. The graph corresponding to the third control information shown in Table 8 is the same as the graph corresponding to the first control information shown in FIG. 9. The graph corresponding to the fourth control information shown in Table 9 is the same as the graph corresponding to the first control information shown in FIG. 7.

The user operates the fourth operating device 56 or the fifth operating device 58 to select the third control information or the fourth control information to select a combination of control states including at least one piece of control information. In addition to the third control information and the fourth control information, the third storage 72 can store at least one further piece of control information related to at least one of the multiple control states. The further piece of control information is similar to the third control information and the fourth control information. The further piece of control information can include a single piece or multiple pieces. In a case where the third storage stores the further piece of control information, the electronic controller 62 selects the third control information, the fourth control information, or the further piece of control information in a predetermined order in accordance with operation of the fourth operating device 56 or the fifth operating device 58. In a case where the selected one of the third control information, the fourth control information, or the further piece of control information corresponds to two or more control states, the electronic controller 62 selects one from the two or more control states in accordance with operation of the first operating portion 58A or operation of the second operating portion 58B in the same manner as the first embodiment.

A process for switching between the third control information and the fourth control information in accordance with the fourth operating device 56 with the electronic controller 62 will now be described with reference to FIG. 10. In a case in which electric power is supplied to the electronic controller 62, the electronic controller 62 starts the process and proceeds to step S41 of the flowchart shown in FIG. 10. In a case in which the flowchart shown in FIG. 10 ends, the electronic controller 62 repeats the process from step S41 after a predetermined interval until the supply of electric power is stopped.

In step S41, the electronic controller 62 determines whether the fourth operating device 56 is operated. In a case where the fourth operating device 56 is not operated, the electronic controller 62 ends the process. In a case where the fourth operating device 56 is operated, the electronic controller 62 proceeds to step S42. In step S42, the electronic controller 62 determines whether the third control information is presently selected. In a case where the third control information is presently selected, the electronic controller 62 proceeds to step S43. In step S42, the electronic controller 62 selects the fourth control information and ends the process.

In step S42, in a case where the third control information is not currently selected, the electronic controller 62 proceeds to step S44. In step S44, the electronic controller 62 determines whether the fourth control information is presently selected. In a case where the fourth control information is not currently selected, the electronic controller 62 ends the process. In a case where the fourth control information is presently selected, the electronic controller 62 proceeds to step S45. In step S45, the electronic controller 62 selects the third control information and ends the process.

Third Embodiment

A third embodiment of a control device 60 will now be described with reference to FIGS. 11 to 18. The control device 60 of the third embodiment has the same configuration as the control device 60 of the first embodiment except that an assist level is changed in at least one control state. In the control device 60 of the third embodiment, same reference characters are given to those elements that are the same as the corresponding elements in the first embodiment. Such elements will not be described in detail.

At least one control state differs in an assist level of the motor 40. The at least one control state includes three or more control states, namely, a maximum control state in which the assist level is maximum, a minimum control state in which the assist level is minimum, and one or more intermediate control states in which the assist level is lower than the maximum control state and higher than the minimum control state. The number of intermediate control states is obtained by subtracting two from the number of the at least one control state. For example, in a case where the number of multiple control states is fifteen, the number of the at least one control states is three or more and fifteen or less, and the number of intermediate control states is one or more and thirteen or less.

For example, the assist level includes at least one of a maximum ratio Amax of an assist force produced by the motor 40 to the human driving force H that is input to the human-powered vehicle 10, an upper limit value MX of output of the motor 40, and a change ratio P of the change rate of output of the motor 40 to the change rate of human driving force H. For example, the change ratio P is a second change ratio P2 in a case where human driving force H decreases. For example, the assist level is configured so that as the assist level increases, the load on the user is reduced. The maximum ratio Amax is equal to the predetermined ratio A of the first embodiment.

In a case where the three or more control states are selected from the multiple control states, the electronic controller 62 is configured to change the assist level in the maximum control state and the assist level in the minimum control state. The electronic controller 62 is configured to change the assist level in the intermediate control states in accordance with the assist level in the maximum control state and the assist level in the minimum control state.

For example, the control system 50 further includes a second operating device 92. Preferably, the second operating device 92 is provided on the external device 80. The second operating device 92 includes at least one of a touchscreen, a mouse, a keyboard, and a button. The second operating device 92 can be the first operating device 54. For example, the electronic controller 62 is configured to change the assist level in the maximum control state and the assist level in the minimum control state in accordance with operation of the second operating device 92.

The assist level in the minimum control state is configured to be changed to be less than or equal to the assist level in the maximum control state. In a case where the assist level in the minimum control state and the assist level in the maximum control state are changed to be equal to each other, the assist level in the intermediate control states is configured to be equal to the assist level in the minimum control state and the assist level in the maximum control state. The assist level in the minimum control state can be configured to be changed to be less than the assist level in the maximum control state.

Figure 12:
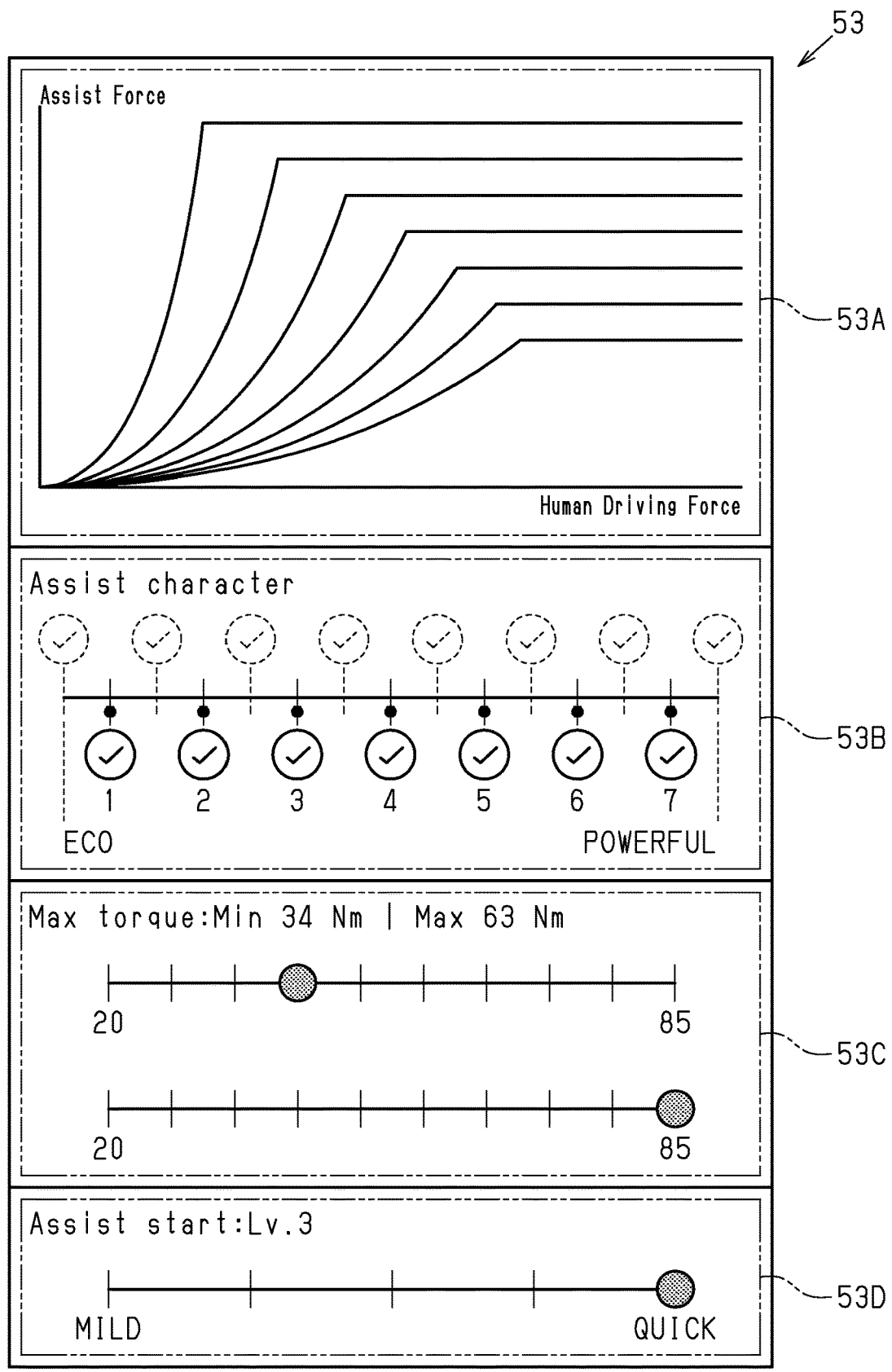
FIG. 12 is a schematic chart showing a first example of a display field shown on the display device of the control system for the human-powered vehicle.
Figure 13:
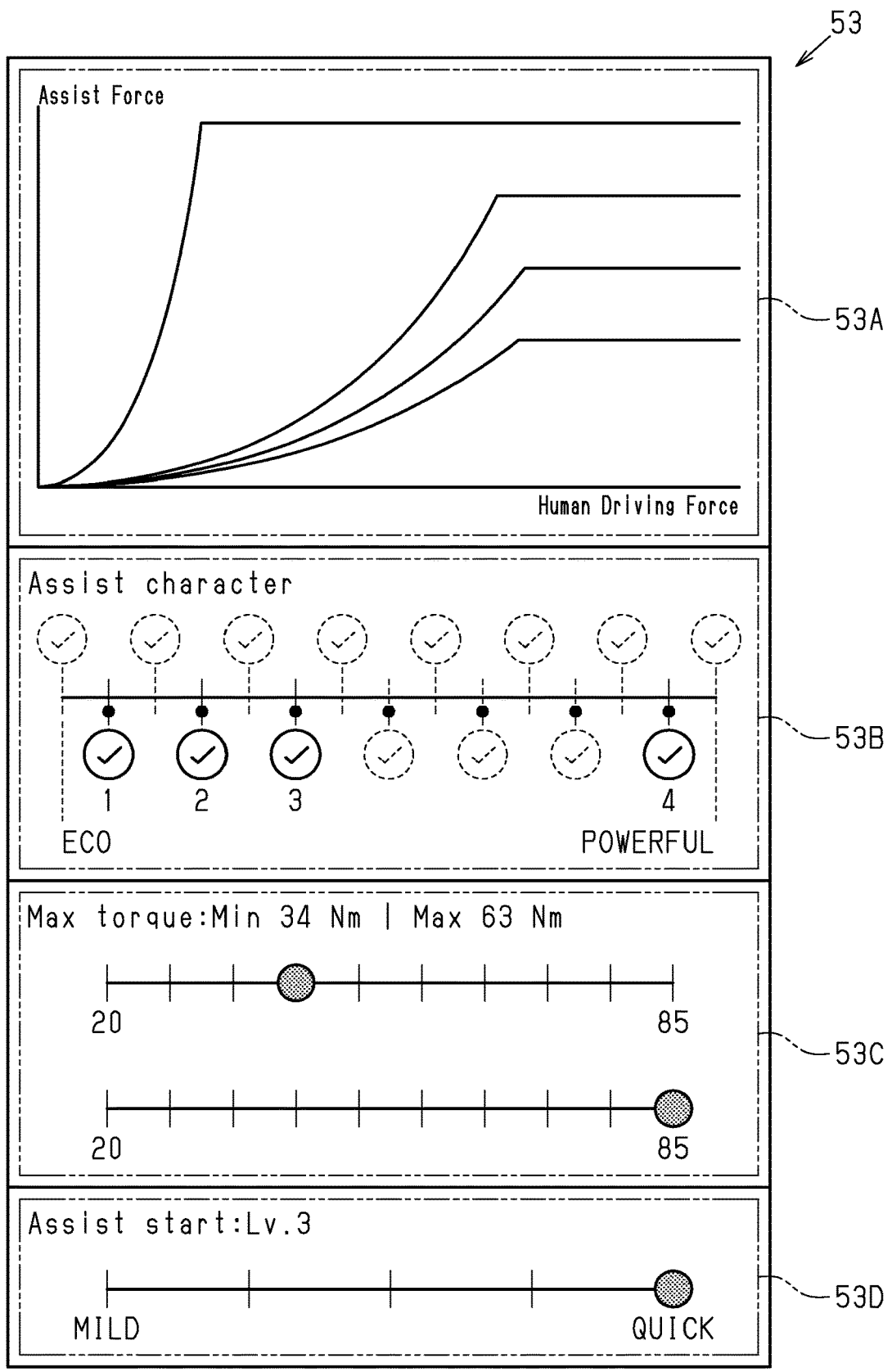
FIG. 13 is a schematic chart showing a second example of a display field shown on the display device of the control system for the human-powered vehicle.

A display field 53 of the display device 52 will now be described with reference to FIGS. 12 and 13. In FIGS. 12 and 13, the number of multiple control states is fifteenth. FIG. 12 shows a state in which seven control states are selected from the multiple control states. FIG. 13 shows a state in which four control states are selected from the multiple control states. In FIGS. 12 and 13, the assist level is the upper limit value MX.

For example, the display field 53 includes a first display field 53A that shows information related to assist levels corresponding to multiple control states. The first display field 53A shows, for example, the assist level of at least one control state selected from the multiple control states. For example, the display field 53 shows the relationship between assist force and human driving force H in each control state in a graph. In the graph, each line indicates one of the control states, and the maximum value of assist force on the line corresponds to the upper limit value MX of the assist level.

For example, the display field 53 includes a second display field 53B that shows information related to control states that are selected from the multiple control states. In the second display field 53B, for example, the multiple control states are shown so that the user can recognize selected control states and non-selected control states. For example, in the second display field 53B, among the multiple control states, the selected control states are indicated in a color that can be easily recognized by the user, and the non-selected control states are indicated in a color that cannot be easily recognized by the user. The first operating device 54 can be configured, in a case where it is a touchscreen disposed to overlap the display field 53 of the display device 52, to allow the user to select at least one of the multiple control states by touching the second display field 53B. Alternatively, the first operating device 54 can be configured to allow the user to select at least one of the multiple control states by operating a cursor shown in the second display field 53B.

For example, the display field 53 includes a third display field 53C that shows information related to the assist level in the maximum control state and information related to the assist level in the minimum control state. The information related to the assist level in the maximum control state is shown by, for example, at least one of a bar graph and a numeral value. The information related to the assist level in the minimum control state is shown by, for example, at least one of a bar graph and a numeral value.

The second operating device 92 can be configured, in a case where it is a touchscreen disposed to overlap the display field 53 of the display device 52, to allow the user to change the assist level in the minimum control state by touching the third display field 53C. Alternatively, the second operating device 92 can be connected to the external device 80 and configured to allow the user to change the assist level in the minimum control state by operating a cursor shown in the third display field 53C. The second operating device 92 can be configured, in a case where it is a touchscreen disposed to overlap the display field 53 of the display device 52, to allow the user to change the assist level in the maximum control state by touching the third display field 53C. Alternatively, the second operating device 92 can be configured to allow the user to change the assist level in the maximum control state by operating the cursor shown in the third display field 53C.

For example, the display field 53 includes a fourth display field 53D that shows information related to a ratio of an increase rate of assist force by the motor to an increase rate of human driving force H at a time of starting the assist of the motor 40. The information related to the ratio of the increase rate of assist force by the motor 40 to the increase rate of human driving force H at a time of starting the assist of the motor 40 is shown by at least one of a bar graph and a numeral value. The first operating device 54 can be configured, in a case where it is a touchscreen disposed to overlap the display field 53 of the display device 52, to allow the user to change the second change ratio P2 by touching the fourth display field 53D. Alternatively, the first operating device 54 can be configured to allow the user to change the second change ratio P2 by operating a cursor shown in the fourth display field 53D.

For example, in a case where the assist level is the upper limit value of output of the motor 40, the electronic controller 62 controls the motor 40 so that as the human driving force H input to the human-powered vehicle 10 increases, the assist force by the motor 40 increases until the output of the motor 40 reaches the upper limit value MX. For example, the electronic controller 62 is configured to control the motor 40 so that as the assist level increases, the human driving force H becomes smaller at the maximum ratio of the assist force by the motor 40 to the human driving force H that is input to the human-powered vehicle 10.

Figure 14:
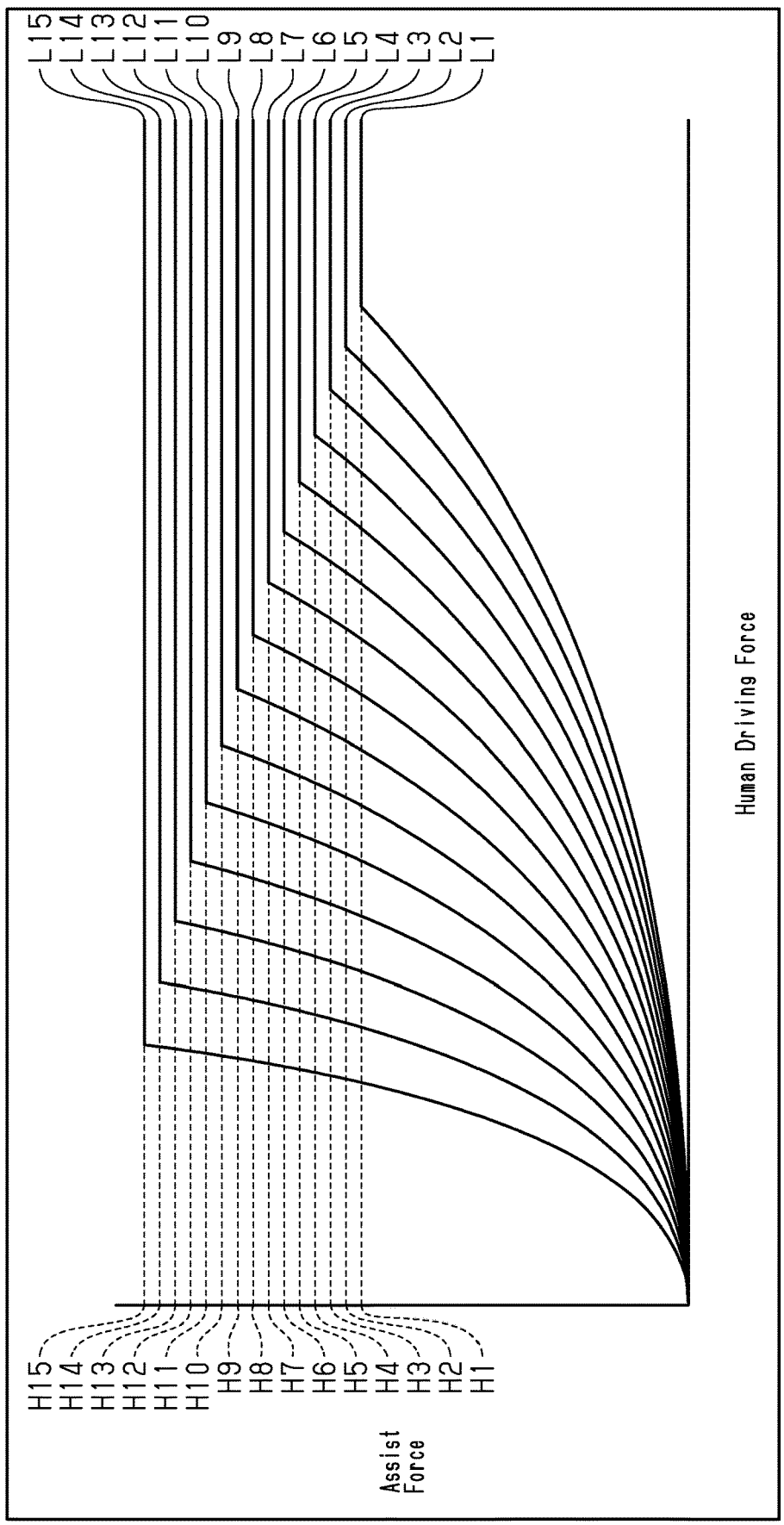
FIG. 14 is a graph showing a first example of the relationship between a human driving force and an assist force in multiple control states.

For example, FIG. 14 shows a graph showing the relationship between human driving force H and assist force in each of the fifteen control states. In FIG. 14, the assist level increases from control state L1 toward control state L15. In FIG. 14, as the assist level increases from the control state L1 to the control state L15, the human driving force H becomes smaller at the maximum ratio of the assist force by the motor 40 to the human driving force H that is input to the human-powered vehicle 10. In FIG. 14, in the control states L1 to L15, H1 to H15 respectively indicate human driving force H at the maximum ratio of the assist force by the motor 40 to the human driving force H that is input to the human-powered vehicle 10.

For example, in a case where the assist level is the upper limit value of output of the motor 40, the electronic controller 62 controls the motor 40 so that as the human driving force H input to the human-powered vehicle 10 increases, the assist force by the motor 40 is increased until the output of the motor 40 reaches the upper limit value MX. The electronic controller 62 is configured to control the motor 40 so that at the maximum ratio of the assist force by the motor 40 to the human driving force H input to the human-powered vehicle 10, the human driving force H is greater in at least one of the intermediate control states than in the maximum control state and the minimum control state.

Figure 15:
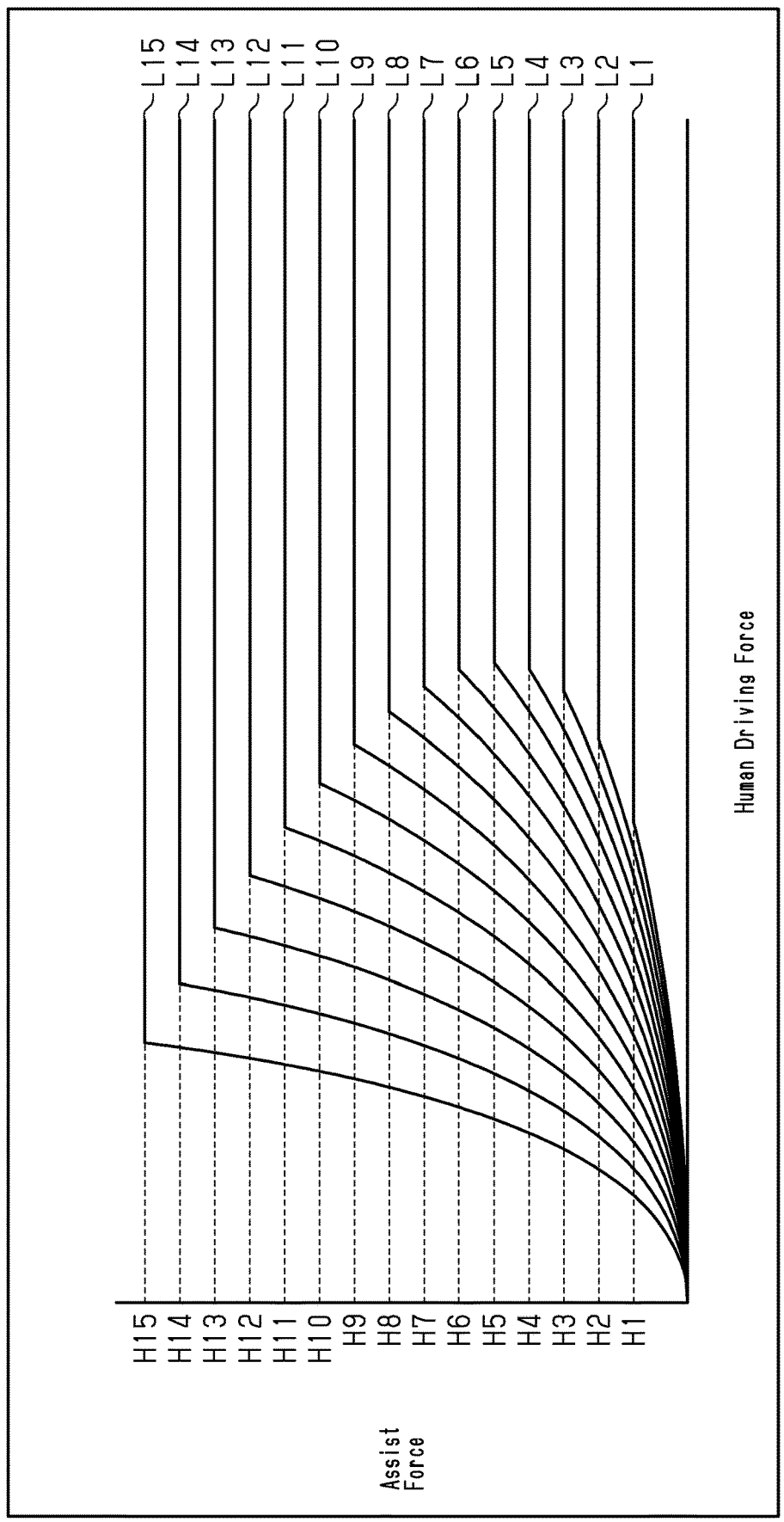
FIG. 15 is a graph showing a second example of the relationship between the human driving force and the assist force in multiple control states.

For example, FIG. 15 shows a graph showing the relationship between human driving force H and assist force in each of the fifteen control states. In FIG. 15, the assist level increases from control state L1 toward control state L15. In FIG. 15, the control state L1 corresponds to the minimum control state, the control state L15 corresponds to the maximum control state, and the control states L2 to L14 correspond to the intermediate control states. In FIG. 15, the human driving force H at the maximum ratio of the assist force by the motor 40 to the human driving force H input to the human-powered vehicle 10 is the largest in the control state L5.

In FIG. 15, in the control states L1 to L15, H1 to H15 respectively indicate human driving force H at the maximum ratio of the assist force by the motor 40 to the human driving force H that is input to the human-powered vehicle 10. In FIG. 15, as the assist level increases from the control state L1 to the control state L5, the human driving force H becomes smaller at the maximum ratio of the assist force by the motor 40 to the human driving force H input to the human-powered vehicle 10. In FIG. 15, as the assist level increases from the control state L5 to the control state L15, the human driving force H becomes larger at the maximum ratio of the assist force by the motor 40 to the human driving force H input to the human-powered vehicle 10.

For example, the electronic controller 62 determines the assist level of the intermediate control states so that a difference in the assist level is substantially the same between any two control states that differ in the assist level by one level in the three or more control states. For example, in a case where the assist level is the upper limit value MX, the electronic controller 62 determines the upper limit values MX of the intermediate control states so that a difference TD in the upper limit value MX is substantially the same between any two control states that differ in the assist level by one level in the three or more control states.

For example, the electronic controller 62 determines the upper limit value MX in each control state using Equations 1 to 3. For example, stage numbers are assigned in advance to the multiple control states in accordance with the assist level. The stage number of the control state having the lowest assist level among the multiple control states is one, and each of the control states is assigned with a stage number that is increased by one as the assist level increases.

$$Cmid = Ctotal - Cmax - Cmin \qquad \text{Equation 1:}$$

$$TD = (Tmax - Tmin)/(Cmid - 1) \qquad \text{Equation 2:}$$

$$MX = Tmin + TD \times (L - Lmin) \qquad \text{Equation 3:}$$

Cmid expresses the number of intermediate control states.
Ctotal expresses the number of multiple control states.
Cmax expresses the number of control states that are higher in the assist level than the maximum control state in the multiple control states.
Cmin expresses the number of control states that are lower in the assist level than the minimum control state in the multiple control states.
Tmax expresses the upper limit value MX in the maximum control state.
Tmax expresses the upper limit value MX in the minimum control state.
L expresses the stage number in the control state.
Lmin expresses the stage number in the minimum control state.

For example, in a case where the control states of stage numbers 4, 7, 9, 11, and 13 are selected from the control states from stage number 1 to stage number 15, the upper limit value MX in the maximum control state is "Tmax=80 Nm", and the upper limit value MX in the minimum control state is "Tmin=10 Nm", the electronic controller 62 determines that Cmax is two, Cmin is three, and TD is 7.8 Nm. The upper limit value MX of output of the motor 40 in each control state is calculated as follows.

$$L4: MX = 10 \text{ Nm} + 7.8 \text{ Nm} \times (4-4) = 10 \text{ Nm}$$

$$L7: MX = 10 \text{ Nm} + 7.8 \text{ Nm} \times (7-4) = 33 \text{ Nm}$$

$$L9: MX = 10 \text{ Nm} + 7.8 \text{ Nm} \times (9-4) = 49 \text{ Nm}$$

$$L11: MX = 10 \text{ Nm} + 7.8 \text{ Nm} \times (11-4) = 65 \text{ Nm}$$

$$L13: MX = 10 \text{ Nm} + 7.8 \text{ Nm} \times (13-4) = 80 \text{ Nm}$$

Figure 16:
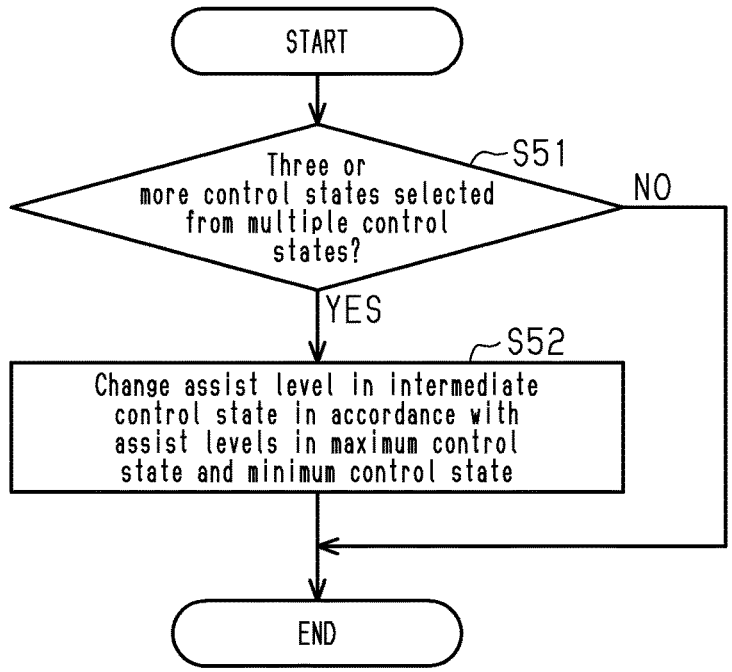
FIG. 16 is a flowchart of a process executed by the electronic controller shown in FIG. 11 for changing the assist level in an intermediate control state.

In a case where three or more control states are selected from the multiple control states, a process executed by the electronic controller 62 for changing the assist level in the intermediate control states will be described with reference to FIG. 16. In a case where an instruction to change at least one control state is received from the external device 80, the electronic controller 62 starts the process and proceeds to step S51 of the flowchart shown in FIG. 16.

In step S51, the electronic controller 62 determines whether three or more control states are selected from the multiple control states. In a case where three or more control states are not selected from the multiple control states, the electronic controller 62 ends the process. In a case where three or more control states are selected from the multiple control states, the electronic controller 62 proceeds to step S52.

In step S52, the electronic controller 62 changes the assist level in the intermediate control states in accordance with the assist level in the maximum control state and the assist level in the minimum control state, stores information related to the changed assist level in the storage 64, and then ends the process. The electronic controller 82 of the external device 80 can be configured to calculate the assist level in the intermediate control states in accordance with the assist level in the maximum control state and the assist level in the minimum control state. In a case where information related to each of the assist level in the maximum control state, the assist level in the minimum control state, and the assist level in the intermediate control states is received from the external device 80, the electronic controller 62 can be configured to store the information related to each of the assist level in the maximum control state, the assist level in the minimum control state, and the assist level in the intermediate control states in the storage 64.

Figure 17:
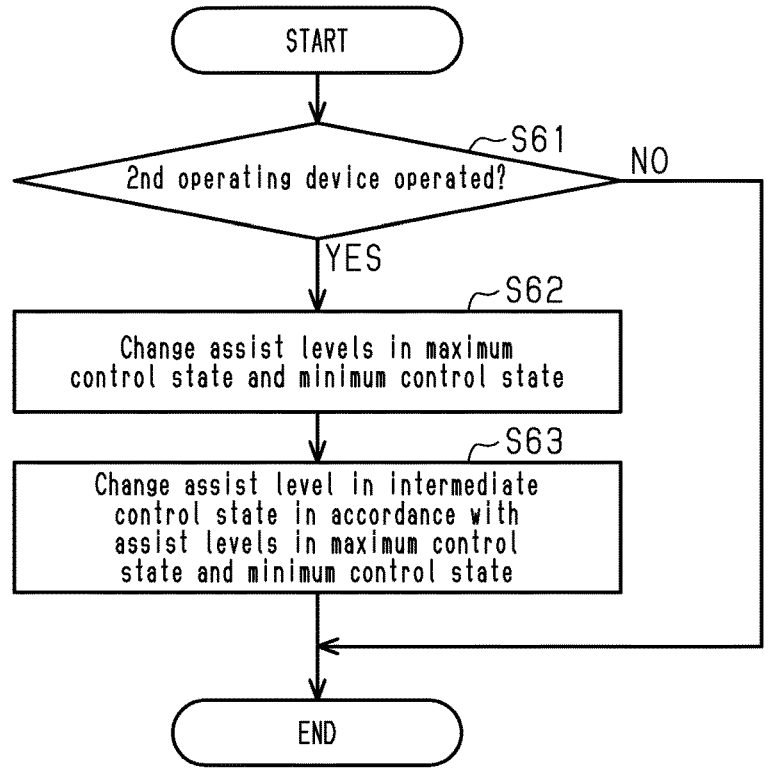
FIG. 17 is a flowchart of a process executed by the electronic controller shown in FIG. 11 for changing the assist level in the maximum control state, the assist level in the minimum control state, and the assist level in the intermediate control state in accordance with operation of a second operating device.

A process for changing the assist level in the maximum control state, the assist level in the intermediate control states, and the assist level in the maximum control state with the electronic controller 62 in accordance with operation of the second operating device 92 will now be described with reference to FIG. 17. In a case where an instruction to change at least one control state is received from the external device 80, the electronic controller 62 starts the process and proceeds to step S61 of the flowchart shown in FIG. 17.

In step S61, the electronic controller 62 determines whether the second operating device 92 is operated. For example, in a case where the second operating device 92 receives an input for changing at least one of the assist level in the maximum control state and the assist level in the minimum control state, the electronic controller 62 determines that the second operating device 92 is operated. In a case where the second operating device 92 is not operated, the electronic controller 62 ends the process. In a case where the second operating device 92 is operated, the electronic controller 62 proceeds to step S62.

In step S62, the electronic controller 62 changes the assist level in the maximum control state and the assist level in the minimum control state, stores information related to the changed assist levels in the storage 64, and then proceeds to step S63. In a case where information related to each of the assist level in the maximum control state, the assist level in the minimum control state, and the assist level in the intermediate control states is received from the external device 80, the electronic controller 62 can be configured to store the information related to each of the assist level in the maximum control state, the assist level in the minimum control state, and the assist level in the intermediate control states in the storage 64.

In step S63, the electronic controller 62 changes the assist level in the intermediate control states in accordance with the assist level in the maximum control state and the assist level in the minimum control state, stores information related to the changed assist level in the storage 64, and then ends the process. In a case where information related to the assist level in the intermediate control states is received from the external device 80, the electronic controller 62 can be configured to store the information related to the assist level in the intermediate control states in the storage 64.

For example, the control system 50 can further include a third operating device 94. Preferably, the third operating device 94 is provided on the external device 80. The third operating device 94 includes at least one of a touchscreen, a mouse, a keyboard, and a button. For example, the electronic controller 62 can be configured to change the assist level in the intermediate control states in accordance with operation of the third operating device 94.

Figure 18:
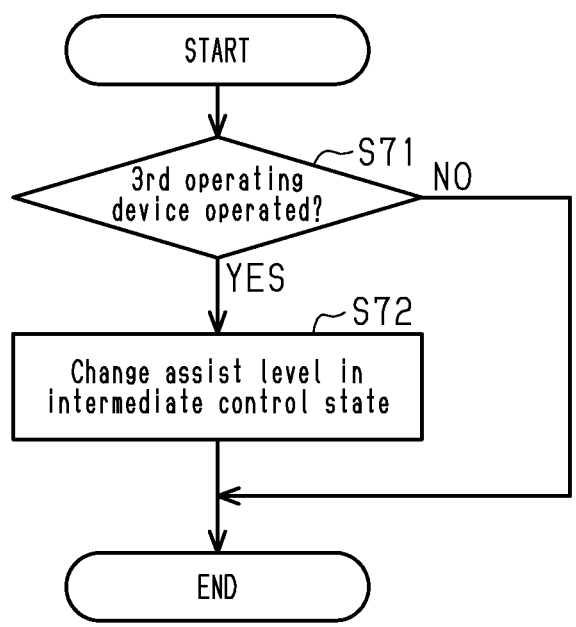
FIG. 18 is a flowchart of a process executed by the electronic controller shown in FIG. 11 for changing the assist level in the intermediate control state in accordance with operation of a third operating device.

A process for changing the assist level in the intermediate control states with the electronic controller 62 will now be described with reference to FIG. 18. In a case where the electronic controller 62 is supplied with electric power, the electronic controller 62 starts the process and proceeds to step S71 of the flowchart shown in FIG. 18. Upon completion of the flowchart shown in FIG. 18, the electronic controller 62 repeats the process from step S71 in predetermined cycles until the supply of electric power is stopped.

In step S71, the electronic controller 62 determines whether the third operating device 94 is operated. For example, in a case where an operation for changing the assist level in the intermediate control states is input to the third operating device 94, the electronic controller 62 determines that the third operating device 94 is operated. In a case where the third operating device 94 is not operated, the electronic controller 62 ends the process. In a case where the third operating device 94 is operated, the electronic controller 62 proceeds to step S72.

In step S72, the electronic controller 62 changes the assist level in the intermediate control states and then ends the process. The electronic controller 62 changes the assist level in the intermediate control states in accordance with the operation of the third operating device 94 that is determined to be input in step S71. In a case where information related to the assist level in the intermediate control states is received from the external device 80, the electronic controller 62 can be configured to store the information related to each assist level in the intermediate control states in the storage 64.

Modifications

The description related to the above embodiments exemplifies, without any intention to limit, applicable forms of a human-powered vehicle control device, a human-powered vehicle control system, and a method for setting a human-powered vehicle control device according to the present disclosure. The human-powered vehicle control device, the human-powered vehicle control system, and the method for setting a human-powered vehicle control device according to the present disclosure can be applied to, for example, modifications of the embodiments that are described below and combinations of at least two of the modifications that do not contradict each other. In the following modifications, the same reference characters are given to those elements that are the same as the corresponding elements of the embodiments. Such elements will not be described in detail.

The first embodiment can be combined with the second embodiment. In this case, the electronic controller 62 is configured to control the electric component 38 in accordance with one of the first control information, the third control information, and the fourth control information by selecting one of the first control information, the third control information, and the fourth control information.

In the second embodiment, the third storage 72 can store one or more pieces of control information other than the third control information and the fourth control information. At least one of two or more control states related to one or more pieces of control information other than the third control information and the fourth control information differs from at least one of two or more control states included in the third control information and also differs from at least one of one or more control states included in the fourth control information. In this case, one of the third control information, the fourth control information, and one or more pieces of control information other than the third control information and the fourth control information is selected.

The first storage 68 can be configured detachably attached to the drive unit 42. In this case, for example, the first storage 68 can be electrically connected to the external device 80, and the electronic controller 82 of the external device 80 can be configured to change the first control information stored in the first storage 68.

The electronic controller 82 of the external device 80 can transmit the control parameter corresponding to the selected graph or the identification information corresponding to the selected graph from the communication device 86 to the communication device 74 of the control device 60. In a case where the communication device 74 receives the control parameter corresponding to the selected graph or the identification information corresponding to the selected graph, the electronic controller 62 changes the first control information in accordance with the received information.

In the second embodiment, at least one of the third control information and the fourth control information can be configured to be unchangeable from an initial set state.

The display device 52 can be provided on the electric component 38. The first operating device 54 can be provided on the electric component 38. The fourth operating device 56 can be provided on the electric component 38.

The electric component 38 can include a shifting device that changes the transmission ratio of the human-powered vehicle, an adjustable seatpost, a suspension device, and a brake device instead of or in addition to the motor 40.

In the first and second embodiments, the upper limit value MX in the multiple control states can be configured as shown in FIG. 14.

In the first and second embodiments, the upper limit value MX in the multiple control states can be configured as shown in FIG. 15.

In the third embodiment, the number of at least one control state does not have to be changeable. In this case, for example, the control device 60 of the human-powered vehicle 10 can be configured as follows. A control device for a human-powered vehicle includes an electronic controller configured to control an electric component of the human-powered vehicle in at least one control state selected from multiple control states that at least partially differ from each other. The at least one control state differs in an assist level of the motor. The at least one control state includes three or more control states including a maximum control state in which the assist level is maximum, a minimum control state in which the assist level is minimum, and one or more intermediate control states in which the assist level is lower than the maximum control state and higher than the minimum control state. In a case where the three or more control states are selected from the multiple control states, the electronic controller is configured to change the assist level in the maximum control state and the assist level in the minimum control state and changes the assist level in the intermediate control states in accordance with the assist level in the maximum control state and the assist level in the minimum control state.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

Also, it will be understood that although the terms "first", "second", "third" and "fourth" may be used herein to describe various components, these components should not be limited by these terms. These terms are only used to distinguish one component from another. Thus, for example, a first component discussed above could be termed a second component, a third component or a fourth component, and vice versa without departing from the teachings of the present invention.

What is claimed is:

1. A control device for a human-powered vehicle, the control device comprising:
    a storage storing a plurality of controls states, the storage including a first storage storing first control information specifying a first subset of the plurality of control states, the first subset including at least one control state among the plurality control states, each of the plurality of control states being at least partially different from other control states among the plurality of control states;
    an electronic controller configured to receive a selection of one control state included in the first subset and control an electric component of the human-powered vehicle in the one control state,
    the electronic controller being configured to change the at least one control state of the first subset by changing the first control information in response to an input by a user, and
    the electronic controller being configured to change a size of the first subset, the size being a number of control states included in the first subset.

2. The control device according to claim 1, wherein the electronic controller is configured to change the first control information stored in the first storage in response to an operation of a first operating device.

3. The control device according to claim 1, further comprising:
    a second storage configured to store second control information specifying a second subset of the plurality of control states,
    the first control information including at least some of the second control information.

4. The control device according to claim 3, wherein the electronic controller is configured to change the first control information stored in the first storage using the second control information.

5. The control device according to claim 1, further comprising:
    a communication device configured to communicate with an external device and receive the first control information from the external device,
    the electronic controller being configured to change the first control information stored in the first storage with the first control information received by the communication device.

6. The control device according to claim 1, further comprising:
    a third storage configured to store third control information specifying a third subset related to two or more control states among the plurality of control states and fourth control information specifying a fourth subset related to at least one or more controls states among the plurality of control states, wherein
    at least one control state in the third subset being different from at least one control state in the fourth subset,
    the electronic controller being configured to receive a selection of the third control information or the fourth control information,
    the electronic controller being configured to control the electric component based on the two or more control states included in the third subset in a case where the third control information is selected, and
    the electronic controller is configured to control the electric component based on the at least one or more control states included in the fourth subset in a case where the fourth control information is selected.

7. The control device according to claim 1, wherein the electric component includes a motor configured to apply a propulsion force to the human-powered vehicle, and
the at least one control state relates to control of the motor.

8. The control device according to claim 6, wherein the electronic controller is configured to select the third control information or the fourth control information in accordance with operation of an operating device.

9. The control device according to claim 6, wherein at least one of the third control information and the fourth control information is changeable.

10. The control device according to claim 7, wherein the at least one control state includes three or more control states, each of the three or more control states differing from each other with respect to an assist level of the motor, the three or more controls states including a maximum control state in which the assist level is maximum, a minimum control state in which the assist level is minimum, and one or more intermediate control states in which the assist level is lower than the maximum control state and higher than the minimum control state,
the electronic controller is configured to change the assist level in the maximum control state and the assist level in the minimum control state in a case where the three or more control states are selected from the plurality of control states, and
the electronic controller is configured to change the assist level in the intermediate control states in accordance with the assist level in the maximum control state and the assist level in the minimum control state.

11. The control device according to claim 10, wherein the electronic controller is configured to change the assist level in the maximum control state and the assist level in the minimum control state in accordance with operation of an operating device.

12. The control device according to claim 10, wherein the electronic controller is configured to change the assist level in the intermediate control states in accordance with operation of an operating device.

13. The control device according to claim 10, wherein the assist level includes at least one of a maximum ratio of an assist force produced by the motor to a human driving force that is input to the human-powered vehicle, an upper limit value of an output of the motor, and a change ratio of a change rate of the output of the motor to a change rate of the human driving force.

14. The control device according to claim 10, wherein the assist level is an upper limit value of an output of the motor,
the electronic controller is configured to control the motor so that as the human driving force input to the human-powered vehicle increases, the assist force produced by the motor increases until the output of the motor reaches the upper limit value, and
the electronic controller is configured to control the motor so that human driving force at a maximum ratio of the assist force produced by the motor to human driving force input to the human-powered vehicle decreases as the assist level increases.

15. The control device according to claim 7, wherein
the plurality of control states differ in at least one of a ratio of an assist force produced by the motor to human driving force input to the human-powered vehicle, an upper limit value of an output of the motor, and a change ratio of a change rate of the output of the motor to a change rate of the human driving force.

16. The control device according to claim 15, wherein
the ratio increases as the human driving force increases.

17. A control system comprising the control device according to claim 15, and the control system further comprising:
a display device,
the display device being configured to show display information corresponding to the plurality of control states.

18. The control system according to claim 17, wherein
the display information includes a graph showing the ratio.

19. A control device for a human-powered vehicle, the control device comprising:
an electronic controller configured to control an electric component of the human-powered vehicle in at least one control state selected from multiple control states in which the multiple control states are at least partially different from each other,
a number of the at least one control state being changeable,
the electric component includes a motor configured to apply a propulsion force to the human-powered vehicle, and
the at least one control state relates to control of the motor and differs in an assist level of the motor, the assist level being an upper limit value of an output produced by the motor,
the at least one control state includes three or more control states including a maximum control state in which the assist level is maximum, a minimum control state in which the assist level is minimum, and one or more intermediate control states in which the assist level is lower than the maximum control state and higher than the minimum control state,
the electronic controller is configured to change the assist level in the maximum control state and the assist level in the minimum control state in a case where the three or more control states are selected from the multiple control states, and
the electronic controller is configured to change the assist level in the intermediate control states in accordance with the assist level in the maximum control state and the assist level in the minimum control state,
the electronic controller being configured to control the motor so that as human driving force input to the human-powered vehicle increases, the assist force produced by the motor increases until the output of the motor reaches the upper limit value, and
the electronic controller being configured to control the motor so that human driving force at a maximum ratio of the assist force produced by the motor to human driving force input to the human-powered vehicle is greater in at least one of the intermediate control states than in the maximum control state and the minimum control state.

20. A control device for a human-powered vehicle, the control device comprising:
an electronic controller configured to control an electric component including a motor that applies a propulsion force to the human-powered vehicle in a plurality of control states; and
a storage configured to store first control information specifying a first subset of the plurality of control states and second control information specifying a second subset of the plurality of control states, the first subset including two or more control states among the plurality of control states and the second subset including at least one or more of the plurality of control states,
at least one of the two or more control states in the first subset being different from at least one of the at least one or more control states in the second subset, and a first size of the first subset being different from a second size of the second subset, the first size being a number of control states included in the first subset and the second size being a number of control states included in the second subset,
the electronic controller being configured to receive a selection of the first control information or the second control information,
the electronic controller being configured to control the electric component based on the two or more control states included in the first subset in a case where the first control information is selected, and
the electronic controller being configured to control the electric component based on the at least one or more control states included in the second subset in a case where the second control information is selected.

21. A method for setting a control state of a control device for a human-powered vehicle, wherein the control device includes an electronic controller that is configured to control an electric component of the human-powered vehicle in at least one control state selected from a plurality control states, the plurality of control states are at least partially different from each other, the method comprising using the electronic controller to execute:
storing the plurality of controls states in a storage;
storing control information in the storage, the control information specifying a subset of the plurality of control states, the subset including at least one control state among the plurality control states;
receiving a selection of one control state included in the subset and controlling the electric component of the human-powered vehicle in the one control state;
receiving an input from a user; and
changing the at least one control state included in the subset by changing the control information in response to the input, the changing the at least one control state includes changing a size of the subset, the size being a number of control states included in the subset.

* * * * *